US008188830B2

(12) United States Patent
Nakahori

(10) Patent No.: US 8,188,830 B2
(45) Date of Patent: May 29, 2012

(54) TRANSFORMER AND SWITCHING POWER SUPPLY UNIT

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 317 days.

(21) Appl. No.: 12/719,542

(22) Filed: Mar. 8, 2010

(65) Prior Publication Data

US 2010/0232181 A1 Sep. 16, 2010

(30) Foreign Application Priority Data

Mar. 16, 2009 (JP) ................................ 2009-063548
Jan. 22, 2010 (JP) ................................ 2010-011682

(51) Int. Cl.
*H01G 5/00* (2006.01)
*H01F 27/24* (2006.01)

(52) U.S. Cl. ......................... 336/212; 336/214; 336/200

(58) Field of Classification Search .................. 336/212, 336/200, 223, 232, 221, 220
See application file for complete search history.

(56) References Cited

U.S. PATENT DOCUMENTS

| | | | | |
|---|---|---|---|---|
| 5,126,714 | A * | 6/1992 | Johnson | 336/83 |
| 5,155,676 | A * | 10/1992 | Spreen | 363/126 |
| 5,542,304 | A * | 8/1996 | Sasada et al. | 73/862.333 |
| 6,593,837 | B2 * | 7/2003 | Takayama | 336/83 |
| 6,873,237 | B2 | 3/2005 | Chandrasekaran et al. | |
| 7,046,523 | B2 | 5/2006 | Sun et al. | |
| 7,295,094 | B2 | 11/2007 | Jitaru et al. | |
| 7,417,875 | B2 | 8/2008 | Chandrasekaran et al. | |
| 7,839,255 | B2 * | 11/2010 | Nagano et al. | 336/221 |
| 8,004,380 | B2 * | 8/2011 | Moiseev | 336/170 |
| 2005/0110606 | A1 * | 5/2005 | Vinciarelli | 336/200 |
| 2008/0239759 | A1 | 10/2008 | Nakahori | |
| 2008/0247195 | A1 | 10/2008 | Nakahori | |
| 2009/0079402 | A1 | 3/2009 | Nakahori | |
| 2009/0109709 | A1 | 4/2009 | Nakahori | |
| 2009/0109710 | A1 | 4/2009 | Nakahori | |
| 2009/0168461 | A1 | 7/2009 | Nakahori | |

FOREIGN PATENT DOCUMENTS

| | | |
|---|---|---|
| JP | A-2005-038872 | 2/2005 |
| JP | A-2007-088131 | 4/2007 |
| JP | A-2008-199720 | 8/2008 |
| JP | A-2008-199721 | 8/2008 |
| JP | A-2008-253113 | 10/2008 |
| JP | A-2008-259387 | 10/2008 |
| JP | A-2009-100645 | 5/2009 |
| JP | A-2009-135320 | 6/2009 |
| JP | A-2009-136137 | 6/2009 |
| JP | A-2009-178018 | 8/2009 |
| JP | A-2009-178020 | 8/2009 |

* cited by examiner

*Primary Examiner* — Anh Mai
(74) *Attorney, Agent, or Firm* — Oliff & Berridge, PLC

(57) ABSTRACT

The transformer includes: a magnetic core having two base-plates and four legs; a first conductive member as a first winding, having four through-holes through which the four legs pass, respectively; and one or more second conductive members as a second winding, each having four through-holes through which the four legs pass, respectively. The first and second windings are wound around the four legs. Closed magnetic paths are formed inside the magnetic core from the four legs to the two base-plates due to currents flowing through the first or the second winding. A couple of magnetic fluxes each generated inside each of a couple of legs arranged along one diagonal line are both directed in a first direction, while another couple of magnetic fluxes each generated inside each of another couple of legs arranged along another diagonal line are both directed in a second direction opposite to the first direction.

14 Claims, 24 Drawing Sheets

TRANSFORMER AND SWITCHING POWER SUPPLY UNIT

BACKGROUND OF THE INVENTION

1. Field of the Invention

The present invention relates to a transformer having a magnetic core and a conductive member, and a switching power supply unit provided with such transformer.

2. Description of the Related Art

Hitherto, various types of DC-DC converters have been proposed as a switching power supply unit and provided for practical use. Many of them are of a type in which a direct current input voltage is switched by switching operation of a switching circuit (inverter circuit) connected to a primary winding of a power converting transformer (transformer element), and the switched output (inverter output) is supplied to a secondary winding of the power converting transformer (transformer). A voltage appearing in the secondary winding in accordance with such switching operation of the switching circuit is rectified by a rectifier circuit, then the rectified voltage is converted into a direct current by a smoothing circuit and outputted.

This sort of switching power supply unit employs as a magnetic core of the above-mentioned transformer an E-shaped core (FE core, EI core, etc.) or a U-shaped core (UU core, UI core, etc.: see Japanese Patent Application Publication No. 2008-253113, for example), for example. In the case of the E-shaped core, winding is wound around a center leg so that a conductor passes between the outer legs and the center leg. On the other hand, in the U-shaped core, winding is wound around so that a conductor passes through the inner sides of the both legs thereof. Accordingly, the interval between the both legs of the U-shaped core is nearly twice as large as that between the center leg and the outer legs of the E-shaped core.

SUMMARY OF THE INVENTION

Here, in the transformer in which the U-shaped core is used as its magnetic core as in the above-mentioned Japanese Patent Application Publication No. 2008-253113, the radiation path of the secondary winding is expandable compared with the case where the E-shaped core is employed. Thus temperature of the winding may be lowered. That enables the switching power supply unit, as a whole unit, to deal with a big current without parallel operation of a plurality of inverter circuits, transformers and so on.

However, employment of such U-shaped core increases the thickness of an upper core and a lower core compared with the case where an E-shaped core is employed, so it is difficult to realize a lower height of the core member. This is because, since magnetic flux is liable to concentrate on the inner periphery of the U-shaped core, the U-shaped core is required to be larger in thickness in order to reduce magnetic density thereof, provided that the width of the core is equal to that of the E-shaped core.

In addition, as mentioned above, it is necessary for the U-shaped core to take a large interval of legs. Accordingly, when the radiation path is limited in the direction of a base plate as a heat sink, the radiation path from the center portion of the upper core to a coolant is likely to have a higher thermal resistance. Thus the center portion of the upper core is likely to have a high temperature. Here, such high-temperature core has a smaller saturation flux density to reach the magnetic saturation, which may result in the destruction of switching elements and deterioration of material. In particular, the deterioration in electrical insulating material of an insulating transformer may result in the dielectric breakdown, and is a threatening issue of a product life cycle or product safety. In order to reduce the core loss and thermal resistance, the core size needs to be enlarged so as to decrease the flux density and thermal resistance. That may bring about a larger apparatus and increase in cost.

As mentioned above, it is difficult for the transformer that employs an E-shaped core or a U-shaped core of related art to realize both of a lower (smaller) core and expansion of radiation path. Thus it is also difficult to realize cost reduction while increasing reliability of product. Accordingly, there is a room for improvement.

The present invention has been devised in view of the above issues, and it is desirable to provide a transformer and a switching power supply unit by which cost reduction is realizable while increasing reliability of product.

A first transformer according to an embodiment of the present invention comprises: a magnetic core including two base-plates facing each other and four legs provided between the two base-plates to couple the two base-plates together, the four legs being arranged along a pair of diagonal lines intersecting each other in a plane along facing surfaces of the two base-plates; a first conductive member having four through-holes through which the four legs pass respectively, and configuring a first winding which is wound around the legs; and one or more second conductive members each having four through-holes through which the four legs pass, respectively, and each configuring a second winding which is wound around the four legs. Here, the first and second windings are wound around so that closed magnetic paths are formed inside the magnetic core from the four legs to the two base-plates due to currents which flow through the first or the second winding, and so that a couple of magnetic fluxes each generated inside each of a couple of legs arranged along one of the two diagonal lines are both directed in a first direction, while so that another couple of magnetic fluxes each generated inside each of another couple of legs arranged along another diagonal line are both directed in a second direction which is opposite to the first direction.

A first switching power supply unit according to an embodiment of the present invention generates an output voltage through conversion of an input voltage inputted from a pair of input terminals and outputs the output voltage from a pair of output terminals. The switching power supply unit comprising: a switching circuit arranged on a side of the pair of input terminals; a rectifier circuit arranged on a side of the pair of output terminals; and the above-mentioned first transformer provided between the switching circuit and the rectifier circuit. Here, the first winding is disposed on a side of the switching circuit and the second winding is disposed on a side of the rectifier circuit. In the switching power supply unit, an input voltage inputted from the input terminal pairs is switched in the switching circuit to generate an alternating voltage. Then, the alternating voltage is transformed by the transformer and then rectified by the rectifier circuit. Thus an output voltage is outputted from the output terminal pairs.

In the first transformer and the first switching power supply unit according to an embodiment of the present invention, the first and second windings are wound around so that closed magnetic paths are formed inside the magnetic core from the four legs to the two base-plates due to currents which flow through the first or the second winding, and so that a couple of magnetic fluxes each generated inside each of a couple of legs arranged along one of the two diagonal lines are both directed in a first direction, while so that another couple of magnetic fluxes each generated inside each of another couple of legs arranged along another diagonal line are both directed in a second direction which is opposite to the first direction. Accordingly, four closed magnetic paths are formed inside the magnetic core from the four legs to the two base-plates due to currents which flow through the first or the second winding, the four closed magnetic paths each passing through both adjacent two of the four legs and the two base-plates and then returning. Accordingly, reduction of flux density in magnetic core is available due to the dispersion of flux path compared with the case of a U-shaped core, thereby reducing the core loss. Further, since radiation path is expanded compared with the case of an E-shaped core, cooling of the first and second windings gets more easy as with the cooling of the magnetic core itself.

The first transformer according to an embodiment of the present invention, two of the second conductive members may be disposed to sandwich the first conductive member. In this case, in each of the two second conductive members, a pair of the second windings may be wound around to be connected in series each other, or may be wound around to be connected in parallel each other.

In the first transformer according to an embodiment of the present invention, only one of the second conductive member may be disposed either above or below the first conductive member, and a pair of the second windings may be wound around to be connected in parallel each other in the second conductive member. In such configuration, one side of the first conductive member may also be exposed. As a result, heat can be effectively radiated also from the first conductive member compared with the case where two of the second conductive members are provided, and heat dissipation characteristics can be more improved.

In the first transformer according to an embodiment of the present invention, the first winding may be wound around the four leg portions one by one in order in the first conductive member, or the first winding may be wound around two of the four leg portions provided along one of the two diagonal lines one by one and wound around the other two of the four leg portions provided along the other diagonal line one by one in order. Here, the former configuration has a lower line capacity than the latter configuration, and thus improves high frequency characteristics.

In the first transformer according to an embodiment of the present invention, preferably, the four leg portions are configured such that at least mutually-opposed side-faces thereof are parallelized each other. In such configuration, concentration of flux density in magnetic core is more effectively suppressed, thereby more reducing the core loss. In this case, preferably, an outer surface of the four leg portions, on a side opposite to the mutually-opposed side-faces, is a curved surface. In such configuration, the first and second windings may be wound around the periphery of each leg portion more easily. Thus a current path is shortened, and concentration of current distribution to angular portions is relieved.

In the first transformer according to an embodiment of the present invention, preferably, the first and second windings are configured to be pulled out from outside along the in-plane direction of the first and the second conductive members. In such configuration, the wiring for connecting to these windings can be pulled out in the in-plane direction of the conductive members. Thus the height of the core including the wiring can be lowered compared with a case where such wiring is pulled out in a direction vertical to the plane of the plate-lie conductive member, while a pullout structure of the wiring becomes more simple.

In the first transformer according to an embodiment of the present invention, the four leg portions may be disposed to constitute the four corners of a square plane of the substrate portion.

In the first transformer according to an embodiment of the present invention, preferably, at least one of the two substrate portions includes an opening portion because such configuration enables to enlarge a heat dissipating area and thus the heat dissipation characteristics are more improved. What is more, reduction in weight and cost for component materials may be further developed. In addition, in this configuration, it is more preferable to further dispose a heat dissipating member, which is provided with a base portion thermally connected to the substrate portion having the above-mentioned opening portion and a protruding portion that is shaped to be inserted into the opening portion and is thermally connected to the above-mentioned first or second conductive member. In this configuration, the heat dissipating area is still more enlarged and thus the heat dissipation characteristics are still more improved.

A second transformer of an embodiment of the present invention comprises: a magnetic core including two base-plates facing each other and four legs provided between the two base-plates to couple the two base-plates together, the four legs being arranged along a pair of diagonal lines intersecting each other in a plane along facing surfaces of the two base-plates; a first conductive member having four through-holes through which the four legs pass respectively, and configuring a first winding which is wound around the legs; and one or more second conductive members each having four through-holes through which the four legs pass, respectively, and each configuring a second winding which is wound around the four legs. Here, the first and second windings are wound around so that four closed magnetic paths are formed inside the magnetic core from the four legs to the two base-plates due to currents which flow through the first or the second winding, the four closed magnetic paths each passing through both adjacent two of the four legs and the two base-plates and then returning.

A second switching power supply unit according to an embodiment of the present invention generates an output voltage through conversion of an input voltage inputted from a pair of input terminals and outputs the output voltage from a pair of output terminals. The switching power supply unit comprising: a switching circuit arranged on a side of the pair of input terminals; a rectifier circuit arranged on a side of the pair of output terminals; and the above-mentioned second transformer provided between the switching circuit and the rectifier circuit. Here, the first winding is arranged on the side of the above-mentioned switching circuit, and the second winding is arranged on the side of the above-mentioned rectifier circuit.

In the second transformer and the second switching power supply unit according to an embodiment of the present invention, the four closed magnetic paths are formed inside the magnetic core from the four legs to the two base-plates due to currents which flow through the first or the second winding, the four closed magnetic paths each passing through both adjacent two of the four legs and the two base-plates and then returning. In this configuration, reduction of flux density in magnetic core is available due to the dispersion of flux path compared with the case of a U-shaped core, thereby reducing the core loss. Further, since radiation path is expanded compared with the case of an E-shaped core, cooling of the first and second windings gets more easy as with the cooling of the magnetic core itself.

According to the first transformer and the first switching power supply unit of the embodiment of the present invention, the first and second windings are wound around so that closed magnetic paths are formed inside the magnetic core from the four legs to the two base-plates due to currents which flow through the first or the second winding, and so that a couple of magnetic fluxes each generated inside each of a couple of legs arranged along one of the two diagonal lines are both directed in a first direction, while so that another couple of magnetic fluxes each generated inside each of another couple of legs arranged along another diagonal line are both directed in a second direction which is opposite to the first direction. As a result, the flux density in magnetic core can be decreased and core loss can be reduced compared with the case of a U-shaped core. Thus, the core height can be lowered by reducing the core thickness (thickness of a substrate portion). Further, since radiation path is expanded compared with the case of an E-shaped core, cooling of the first and second windings gets more easy as with the cooling of the magnetic core itself. As a result, cost reduction is available while increasing reliability of product.

According to the second transformer and the second switching power supply unit of the embodiment of the present invention, the four closed magnetic paths are formed inside the magnetic core from the four legs to the two base-plates due to currents which flow through the first or the second winding, the four closed magnetic paths each passing through both adjacent two of the four legs and the two base-plates and then returning. As a result, the flux density in magnetic core can be decreased and core loss can be reduced compared with the case of the U-shaped core. Thus, the core height can be lowered by reducing the core thickness (thickness of the substrate portion). In addition, since radiation path is expanded compared with the case of an E-shaped core, cooling of the first and second windings gets more easy as with the cooling of the magnetic core itself. As a result, cost reduction is available while increasing reliability of product.

DESCRIPTION OF THE PREFERRED EMBODIMENTS

Embodiments of the invention will be described in detail hereinbelow with reference to the drawings.

Embodiment of the Invention (Whole Configuration Example of a Switching Power Supply Unit)

Figure 1:
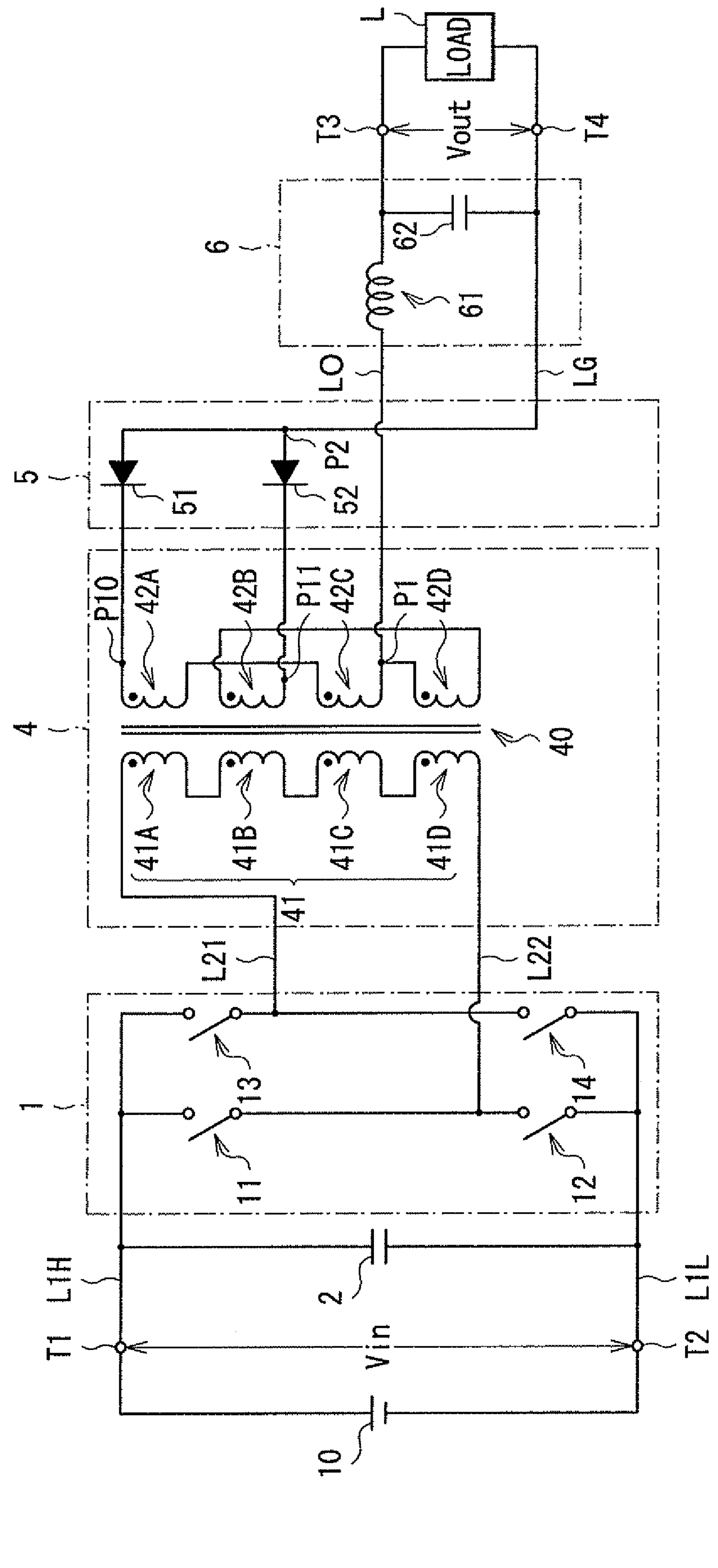
FIG. 1 is a circuit diagram showing a configuration of a switching power supply unit according to an embodiment of the present invention.

FIG. 1 is a circuit diagram of a switching power supply unit according to an embodiment of the present invention. The switching power supply unit functions as a DC-DC converter which converts a higher DC input voltage Vin supplied from a high voltage battery 10 into a lower DC output voltage Vout and supplies it to a low voltage battery (not illustrated) so that a load L is driven.

The switching power supply unit includes an input smoothing capacitor 2 provided between a primary side high voltage line L1H and a primary side low voltage line L1L, an inverter circuit 1 provided between the primary side high voltage line L1H and the primary side low voltage line L1L, and a transformer 4 having primary windings 41 (41A to 41D) and secondary windings (42A to 42D). The higher DC input voltage Vin outputted from the high voltage battery 10 is applied across an input terminal T1 of the primary side high voltage line L1H and an input terminal T2 of the primary side low voltage line L1L. The switching power supply unit also includes a rectifier circuit 5 provided on the secondary side of the transformer 4 and a smoothing circuit 6 connected to the rectifier circuit 5.

The input smoothing capacitor 2 smoothes the DC input voltage Vin applied from the input terminals T1 and T2.

The inverter circuit 1 is a full bridge circuit formed of four switching elements 11 to 14. Specifically, one ends of the switching elements 11 and 12 are connected mutually while one ends of the switching elements 13 and 14 are connected mutually, and these ends are then mutually connected via the primary windings 41A to 41D of the transformer 4. The other ends of the switching elements 11 and 13 are connected mutually while the other ends of the switching elements 12 and 14 are connected mutually, and these other ends are then connected to the input terminals T1 and T2. With such configuration, the inverter circuit 1 converts and outputs the DC input voltage Vin applied across the input terminals T1 and T2 into an AC voltage in accordance with a drive signal supplied from a driving circuit (not illustrated).

Examples of these switching elements 11 to 14 to be used are MOS-FETs (Metal Oxide Semiconductor-Field Effect Transistors) and IGBTs (Insulated Gate Bipolar Transistors) or the like.

The transformer 4 includes a magnetic core 40 configured of an upper core UC and a lower core DC that are facing each other to be described later, the four primary windings 41A to 41D and the four secondary windings 42A to 42D. Among them, the primary windings 41A to 41D are connected in series each other. Specifically, one end of the primary winding 41A is connected to one ends of the switching elements 13 and 14, and the other end is connected to one end of the primary winding 41B. The other end of the primary winding 41B is connected to one end of the primary winding 41C, the other end of the primary winding 41C is connected to one end of the primary winding 41D, and the other end of the primary winding 41D is connected to one ends of the switching elements 11 and 12. In the secondary side of the transformer 4, the secondary windings 42A and 42C are connected in series each other while the secondary windings 42C and 42D are connected in series each other. Specifically, one end of the secondary winding 42A is connected to the cathode of a rectifier diode 51 to be described later while the other end thereof is connected to one end of the secondary winding 42C. In the secondary windings 42B, one end thereof is connected to the cathode of a rectifier diode 52 to be described later while the other end thereof is connected to one end of the secondary winding 42D. The other ends of the secondary windings 42C and 42D are mutually connected at a connection point (center tap) P1, from which a wiring is led toward an output line LO. The transformer 4 transforms an input AC voltage (alternating voltage inputted into the transformer 4) generated by the inverter circuit 1, and a couple of alternating voltages with phases different, by 180 degrees, from each other are outputted from the end P10 opposite to the center tap P1 of a winding which is configured from the pair of secondary windings 42A and 42C, and the end P11 opposite to the center tap P1 of a winding which is configured from the pair of secondary windings 42B and 42D. In this configuration, the degree of transformation is determined based on the turns ratio between the primary windings 41A to 41D and the secondary windings 42A to 42D. The detailed configuration of the rectifier circuit 5 and the above-mentioned transformer 4 will be described later.

The rectifier circuit 5 is a single-phase full-wave rectifier constituted from the pair of rectifier diodes 51 and 52. The cathode of the rectifier diode 51 is connected to one end of the secondary winding 42A while the cathode of the rectifier diode 52 is connected to one end of the secondary winding 42B. The anodes of the rectifier diodes 51 and 52 are connected each other at a connection point P2, which is led to the ground line LG. That is, the rectifier circuit 5 has a configuration of anode-common-connection of a center-tap type, in which the rectifier diodes 51 and 52 rectify the respective half wave periods of the outputted alternating voltages supplied from the transformer 4.

The smoothing circuit 6 is configured to include a choke coil 61 and an output smoothing capacitor 62. The choke coil 61 is inserted in the course of the output line LO such that one end thereof is connected to the center tap P1 while the other end is connected to an output terminal T3 of output line LO. The output smoothing capacitor 62 is connected between the output line LO and the ground line LG. An output terminal T4 is provided at the end of the ground line LG. With such configuration, the smoothing circuit 6 smoothes an voltage rectified by the rectifier circuit 5 to generate a DC output voltage Vout and outputs the DC output voltage Vout from the output terminals T3 and T4 to a low-voltage battery (not shown) for charging.

(Detailed Configuration of the Transformer 4)

Figure 2:
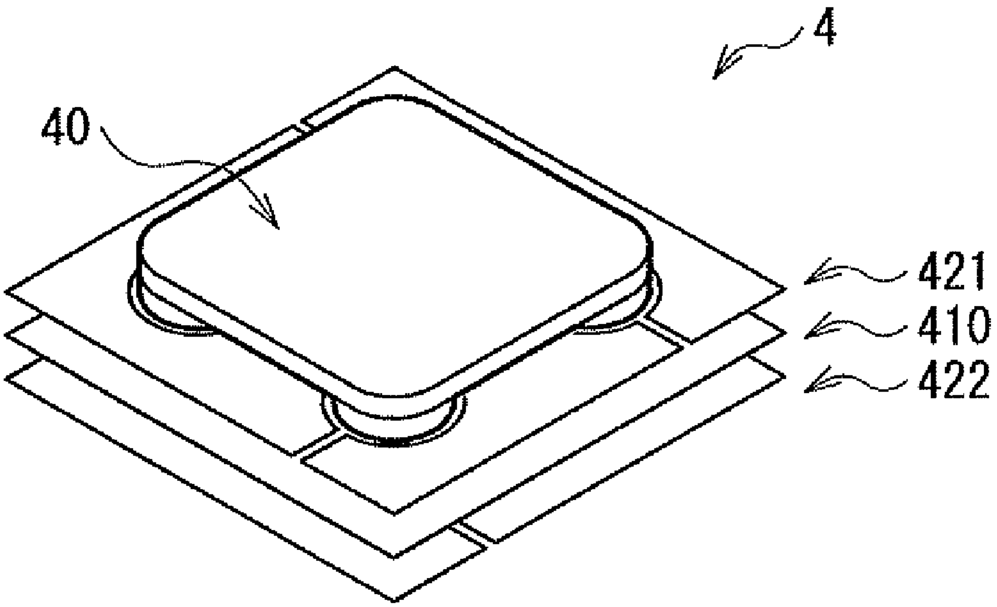
FIG. 2 is a perspective view illustrating an external appearance configuration of a principal part of a transformer of FIG. 1.
Figure 3:
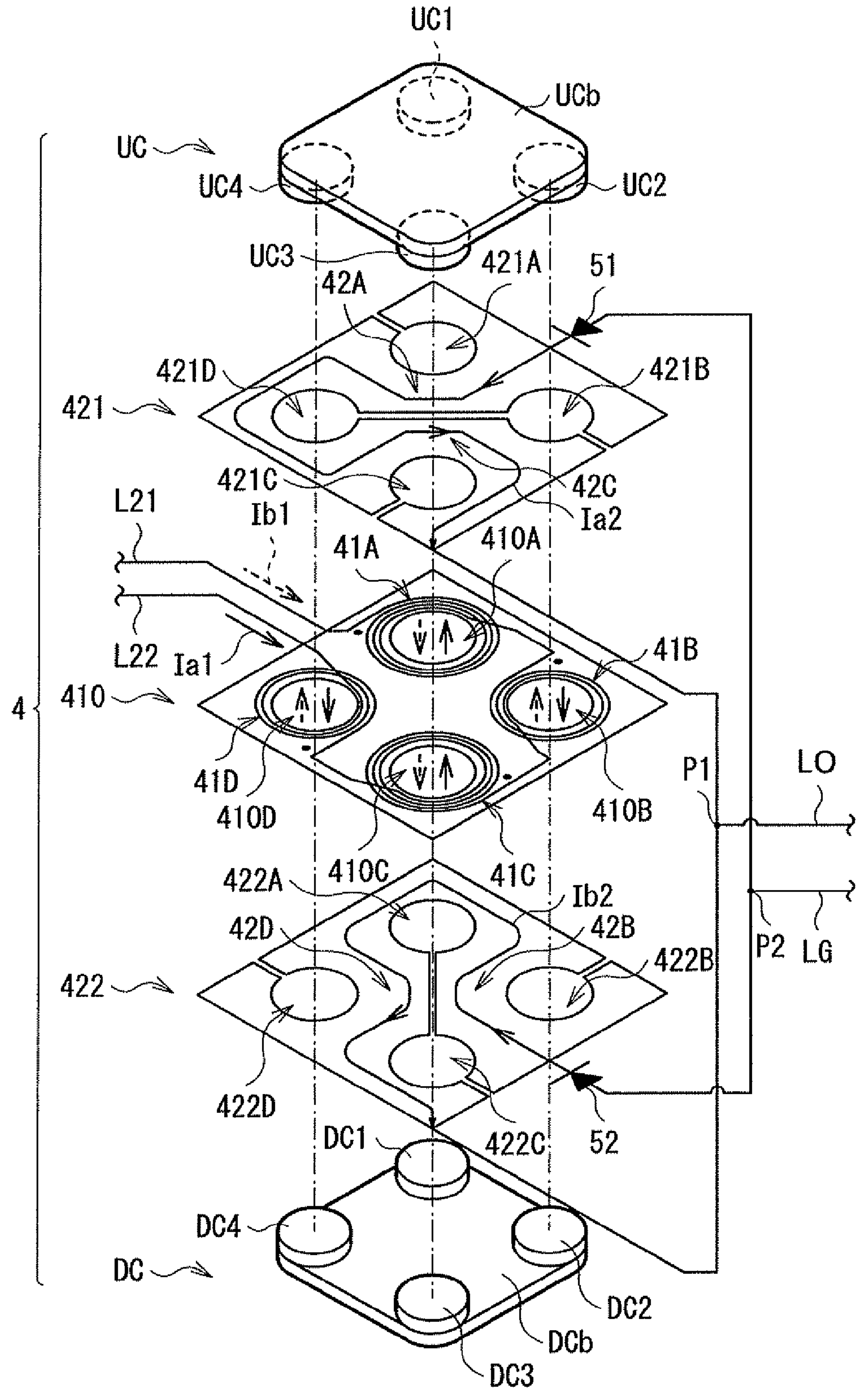
FIG. 3 is an exploded perspective view of the external appearance configuration of the transformer of FIG. 2.
Figure 4A:
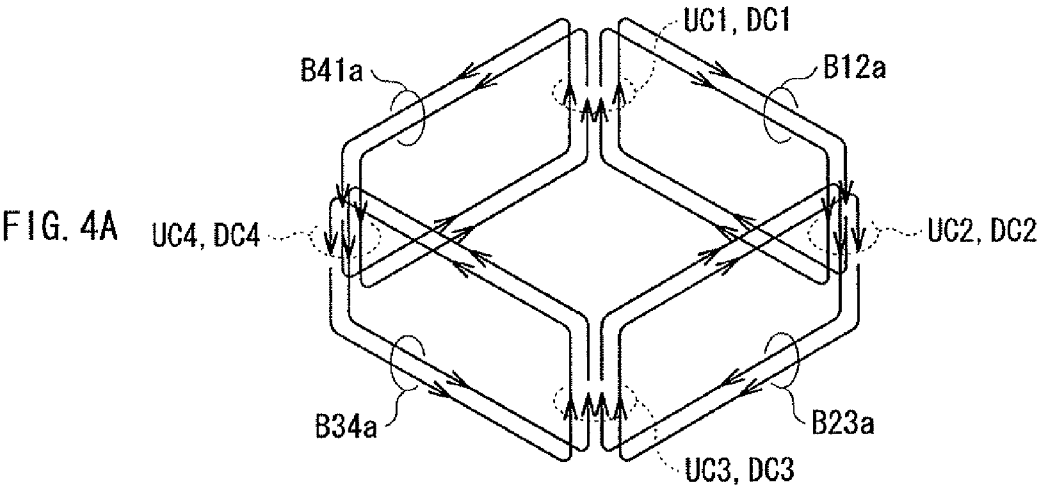
FIGS. 4A and 4B are pattern diagrams showing an example of the reflux of flux paths that are formed in the transformer of FIG. 3.
Figure 4B:
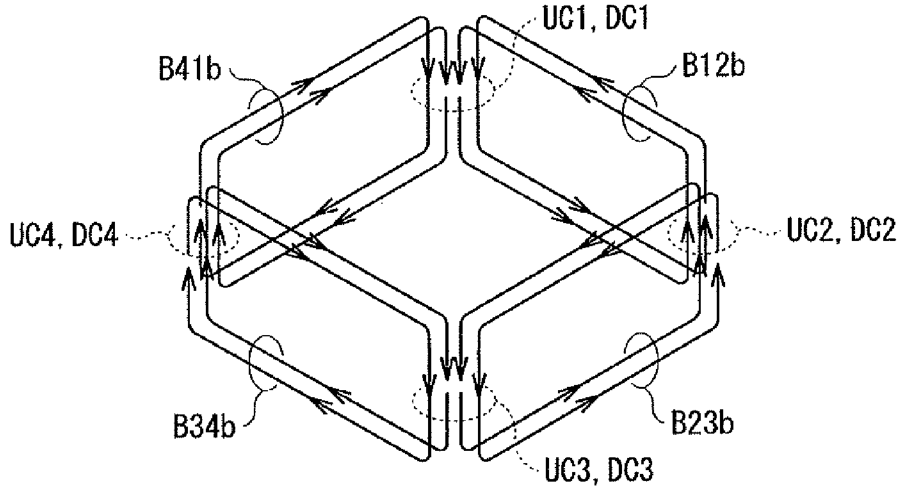

Subsequently, detailed configuration of the transformer 4 as a main characteristic portion of the invention will be described hereinbelow with reference to FIGS. 2 to 4A and 4B. Here, FIG. 2 is a perspective view showing an external appearance configuration of the principal part of the transformer 4, and FIG. 3 is an exploded perspective view showing an external appearance configuration of the transformer 4. FIGS. 4A and 4B schematically show an example of the reflux of flux paths that are formed in the transformer 4.

As shown in FIGS. 2 and 3, the transformer 4 is configured such that a printed coil 410 that constitutes the primary windings 41A to 41D and two metal plates 421 and 422 that constitute the secondary windings 42A to 42D are each wound around a core member (magnetic core 40) constituted from an upper core UC and a lower core DC that are facing each other, in a plane perpendicular to an extending direction (vertical direction) of four leg portions to be described hereinbelow (that is, in a horizontal plane). The upper core UC is constituted from a base core UCb and four leg portions extended from the base core UCb in the above-mentioned perpendicular direction (penetrating direction), that is, a first leg portion UC1, a second leg portion UC2, a third leg portion UC3 and a fourth leg portion UC4. The lower core DC is constituted from a base core DCb and four leg portions extended from the base core DCb in the above-mentioned perpendicular direction (penetrating direction), that is, a first leg portion DC1, a second portion DC2, a third leg portion DC3 and a fourth leg portion DC4. The first leg portions UC1 and DC1, the second leg portions UC2 and DC2, the third leg portions UC3 and DC3 and the fourth leg portions UC4 and DC4 are separately disposed in pairs along two cross lines (two diagonal lines) on the mutually-facing surfaces of the base cores UCb and DCb. These four leg portions UC1 to UC4 and DC1 to DC4 magnetically connect the mutually-facing two base cores UCb and DCb. Specifically, here, the first leg portions UC1 and DC1, the second leg portions UC2 and DC2, the third leg portions UC3 and DC3 and the fourth leg portions UC4 and DC4 are each disposed to constitute the four corners of square plane of the base cores UCb and DCb. Namely, the four leg portions are disposed at the four corners of the base cores UCb and DCb of a rectangular shape (square). The first leg portions UC1 and DC1 and the third leg portions UC3 and DC3 are disposed at both ends of one diagonal line to form a leg portion pair (first leg portion pair), while the second leg portions UC2 and DC2 and the fourth leg portions UC4 and DC4 are disposed at both ends of the other diagonal line to form a leg portion pair (second leg portion pair). The upper core UC and the lower core DC are each made of a magnetic material such as a ferrite, for example, and the printed coil 410 and the metal plate 421 and 422 to be described hereinbelow are made of a conductive material such as copper and aluminum, for example.

The printed coil 410 has four through-holes 410A to 410D through which the leg portions UC1 to UC4 and DC1 to DC4 are passing respectively. The first leg portion UC1 and DC1 are passing through the through-hole 410A, the second leg portions UC2 and DC2 are passing through the through-hole 410B, the third leg portions UC3 and DC3 are passing through the through-hole 410C, and the fourth leg portions UC4 and DC4 are passing through the through-hole 410D. In the printed coil 410, the primary winding 41A wound around the first leg portions UC1 and DC1, the primary winding 41B wound around the second leg portions UC2 and DC2, the primary winding 41C wound around the third leg portions UC3 and DC3 and the primary winding 41D wound around the fourth leg portions UC4 and DC4 are connected in series in this order from a connection line L21 side through a connection line side L22. In other words, the primary windings 41A to 41D are wound around the four leg portions one by one in this order.

The two metal plates 421 and 422 are disposed to sandwich the printed coil 410 in an up/down direction. Four through-holes 421A to 421D through which the leg portions UC1 to UC4 and DC1 to DC4 are passing one to one are formed in the metal plate 421. Similarly, four through-holes 422A to 422D through which the leg portions UC1 to UC4 and DC1 to DC4 are passing one to one are formed in the metal plate 422. The first leg portions UC1 and DC1 are passing through to the through-holes 421A and 422A, the second leg portions UC2 and DC2 are passing through the through-holes 421B and 422B, the third leg portions UC3 and DC3 are passing through the through-holes 421C and 422C, and the fourth leg portions UC4 and DC4 are passing through the through-holes 421D and 422D. In these two metal plates 421 and 422, a pair of the secondary windings are connected in series each other. Specifically, in the metal plate 421, from the cathode side of the diode 51 through the connection point P1 on the output line LO, the secondary winding 42A wound around the first leg portions UC1 and DC1 and the secondary winding 42C wound around the third leg portions UC3 and DC3 are connected in series in this order. In the metal plate 422, from the cathode of the diode 52 through the connection point P1 on the output line LO, the secondary winding 42B wound around the second leg portions UC2 and DC2 and the secondary winding 42D wound around the fourth leg portions UC4 and DC4 are connected in series in this order.

It is to be noted that the primary windings 41A to 41D and the secondary windings 42A to 42D are configured to be pulled out from outside via the wiring (the connection lines L21 and L22, the output line LO or the ground line LG) along the in-plane direction of the printed coil 410 and the metal plates 421 and 422.

With such configuration, in the transformer 4, due to currents (currents Ia1, Ib1, Ia2, Ib2 to be described later) passing through the primary windings 41A to 41D or the secondary windings 42A to 42D, a flux path (reflux of flux path) is formed in the inside of the four leg portions UC1 to UC4 and DC1 to DC4 and the two base cores UCb and DCb, as shown by arrows indicated in FIGS. 3 and 4, for example. Thus, a magnetic flux is formed in the four leg portions UC1 to UC4 and DC1 to DC4 in the penetrating direction thereof. As for the arrows indicated in FIG. 3 within the through-holes 410A to 410D to represent the direction of the magnetic flux, the solid lines correspond to the magnetic flux formed at the time that the currents Ia1 and Ia2 flow, while the broken lines correspond to the magnetic flux formed at the time that the currents Ib1 and Ib2 flow. FIG. 4A shows the reflux of the flux path formed at the time that the currents Ia1 and Ia2 flow, and FIG. 4B shows the reflux of the flux path formed at the time that the currents Ib1 and Ib2 flow. Here, the direction of the magnetic fluxes are the same in the first leg portion pair constituted from the first leg portions UC1 and DC1 and the third leg portions UC3 and DC3, while the direction of the magnetic fluxes are the same in the second leg portion pair constituted from the second leg portions UC2 and DC2 and the fourth leg portions UC4 and DC4. Directions of the magnetic fluxes are opposite each other between the first leg portion pair and the second leg portion pair. In other words, the magnetic flux produced inside the first leg portions UC1 and DC1 and the third leg portions UC3 and DC3 are both directed in a first direction, while the magnetic flux produced inside the second leg portions UC2 and DC2 and the fourth leg portions UC4 and DC4 are both directed in a second direction opposite to the first direction. Further, as shown in FIG. 4 for example, there are four annular magnetic paths formed such as annular magnetic paths B12*a* and B12*b* passing through the inside of the first leg portions UC1 and DC1 and the second leg portions UC2 and DC2, annular magnetic paths B23*a* and B23*b* passing through the inside of the second leg portions UC2 and DC2 and the third leg portions UC3 and DC3, annular magnetic paths B34*a* and B34*b* passing through the inside of the third leg portions UC3 and DC3 and the fourth leg portions UC4 and DC4, and annular magnetic paths B41*a* and B41*b* passing through the inside of fourth leg portions UC4 and DC4 and the first leg portions UC1 and DC1. Namely, the annular magnetic paths B12*a* and B 12*b* and the annular magnetic paths B41*a* and B41*b* are shared by the first leg portions UC1 and DC1, the annular magnetic paths B12*a* B12*b* and the annular magnetic paths B23*a* and B23*b* are shared by the second leg portions UC2 and DC2, the annular magnetic paths B23*a* and B23*b* and the annular magnetic paths B34*a* and B34*b* are shared by the third leg portions UC3 and DC3, and the annular magnetic path B34*a* and B34*b* and the annular magnetic paths B41*a* and B41*b* are shared by the fourth leg portions UC4 and DC4. In other words, four flux paths, each flowing in one direction through adjacent two of the four leg portions UC1 to UC4 and DC1 to DC4 and through the two base cores UCb and DCb, are formed in the four leg portions UC1 to UC4 and DC1 to DC4 and the two base cores UCb and DCb. As will be described in detail hereinafter, formation areas of these four annular magnetic paths go around the four leg portions in the base cores UCb and DCb.

Here, the input terminals T1 and T2 correspond to a specific example of "input terminal pair" of the invention, and the output terminals T3 and T4 correspond to a specific example of "an output terminal pair" of the invention. The primary windings 41 (41A to 41D) correspond to a specific example of "primary windings" of the invention, and the secondary windings 42A to 42D correspond to a specific example of "secondary windings" of the invention. The inverter circuit 1 corresponds to a specific example of "switching circuit" of the invention. The printed coil 410 correspond to a specific example of "first conductive member" of the invention, and the metal plates 421 and 422 correspond to a specific example of “second conductive member” of the invention. The base cores UCb and DCb correspond to a specific example of “two substrate portions” of the invention, and first leg portions UC1 and DC1, the second leg portions UC2 and DC2, the third leg portions UC3 and DC3 and the fourth leg portions UC4 and DC4 correspond to a specific example of “four leg portions” of the invention.

Subsequently, functions and effects of the switching power supply unit according to the embodiment will be explained.

(Example of Basic Operation of a Switching Power Supply Unit)

First, a fundamental operation of a switching power supply unit will be hereinbelow explained with reference to FIGS. 5 and 6.

According to the switching power supply unit, a DC input voltage Vin supplied from the input terminals T1 and T2 are switched and generated into an alternating voltage in the inverter circuit 1, and supplied to the primary windings 41A to 41D of the transformer 4. In the transformer 4, the alternating voltage is then transformed and outputted from the secondary windings 42A to 42D.

In the rectifier circuit 5, the alternating voltage outputted from the transformer 4 is rectified by the rectifier diodes 51 and 52. Thus, a rectified output is generated between the center tap P1 and the connection point P2 of the rectifier diodes 51 and 52.

In the smoothing circuit 6, the rectified output generated in the rectifier circuit 5 is smoothed by the choke coil 61 and the output smoothing capacitor 62, and is outputted as a DC output voltage Vout from the output terminals T3 and T4. Then the DC output voltage Vout is supplied to a not-illustrated low voltage battery for charging so that the load L may be driven.

In the switching power supply unit, the ON-period of the switching elements 11 and 14 and the ON-period of the switching elements 12 and 13 repeatedly alternate in the inverter circuit 1. Accordingly, operation of the switching power supply unit may be described in more detail as follows.

Figure 5:
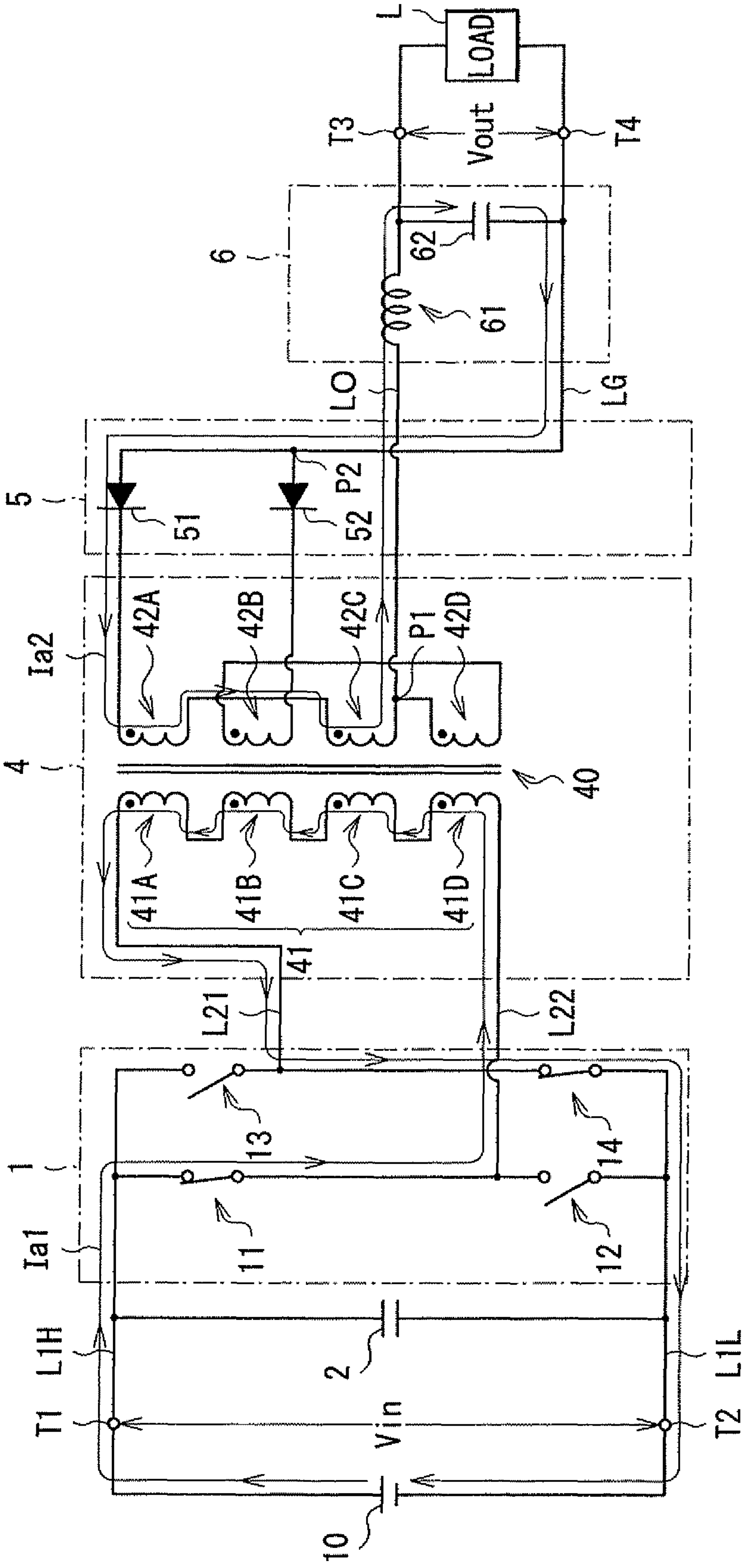
FIG. 5 is a circuit diagram to explain the basic operation of the switching power supply unit illustrated in FIG. 1.

First, as shown in FIG. 5, when the switching elements 11 and 14 of the inverter circuit 1 are turned on, a primary side mesh-current Ia1 flows in a direction from the switching element 11 toward the switching element 14 via the primary windings 41D to 41A. At this time, voltages each appearing in the secondary windings 42A to 42D of the transformer 4 are opposite in direction to that of the rectifier diode 52, while forward in direction with respect to that of the rectifier diode 51. Thus, as illustrated, a secondary mesh-current Ia2 flows in a direction from the rectifier diode 51 through the secondary windings 42A and 42C and the choke coil 61 to the output smoothing capacitor 62 in order. With such secondary mesh-currents Ia2, a DC output voltage Vout is supplied to a low voltage battery (not shown) and the load L is driven.

Figure 6:
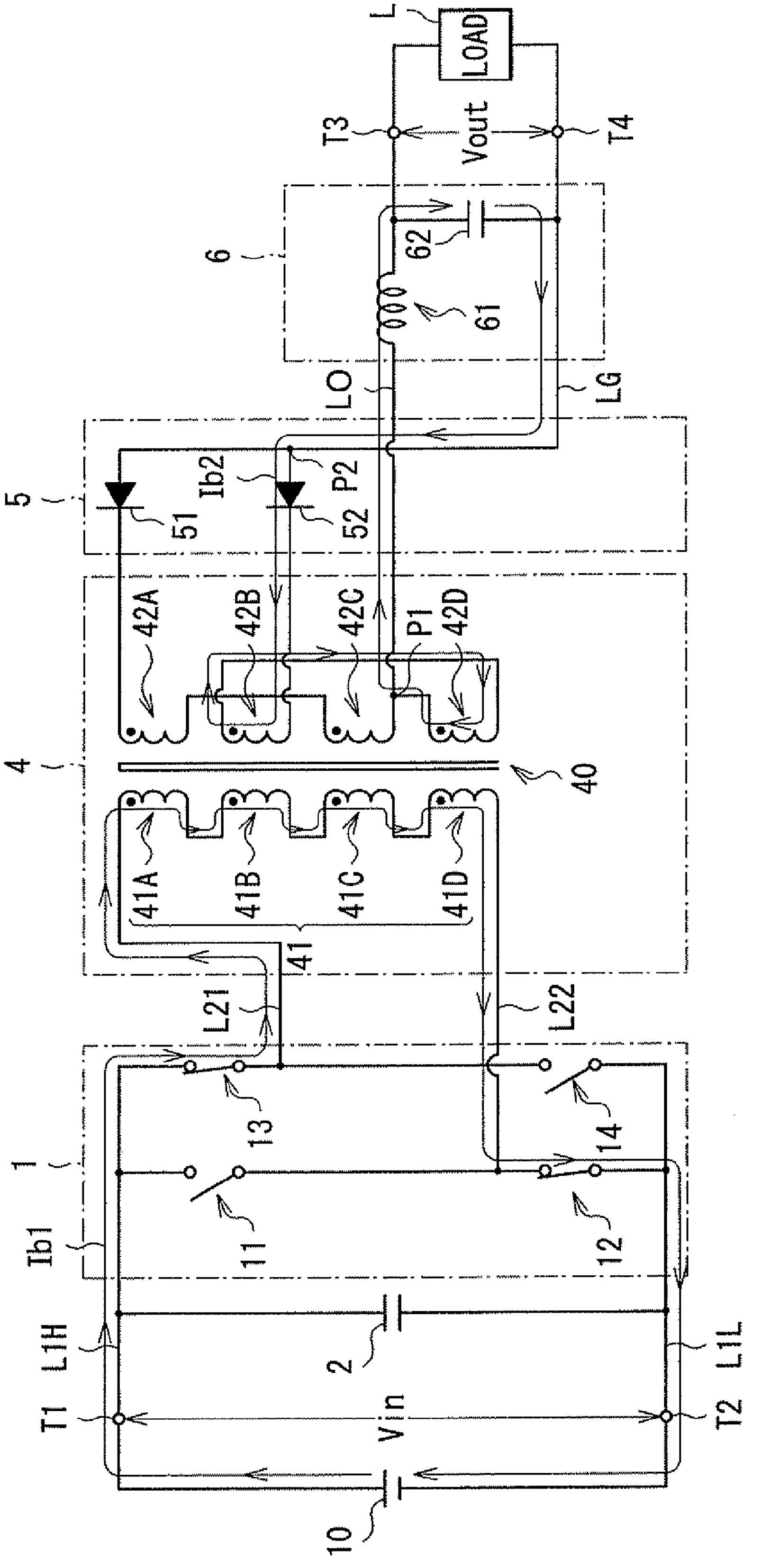
FIG. 6 is a circuit diagram to explain the basic operation of the switching power supply unit illustrated in FIG. 1.

Meanwhile, as shown in FIG. 6, when the switching elements 11 and 14 of the inverter circuit 1 are turned off and the switching elements 12 and 13 of the inverter circuit 1 are turned on, a primary side mesh-current Ib1 as illustrated in the figure flows in a direction from the switching element 13 toward the switching element 12 via the primary windings 41A to 41D. At this time, voltages each appearing in the secondary windings 42A to 42D of the transformer 4 are opposite in direction to the rectifier diode 51, while forward in direction with respect to that of the rectifier diode 52. Thus, a secondary mesh-currents Ib2 flows in a direction from the rectifier diode 52 through the secondary windings 4213 and 42D, the choke coil 61 to the output smoothing capacitor 62 in order. With such secondary mesh-currents Ib2, a DC output voltage Vout is supplied to a low voltage battery (not shown) and the load L is driven.

(Function of the Transformer 4)

Figure 7:
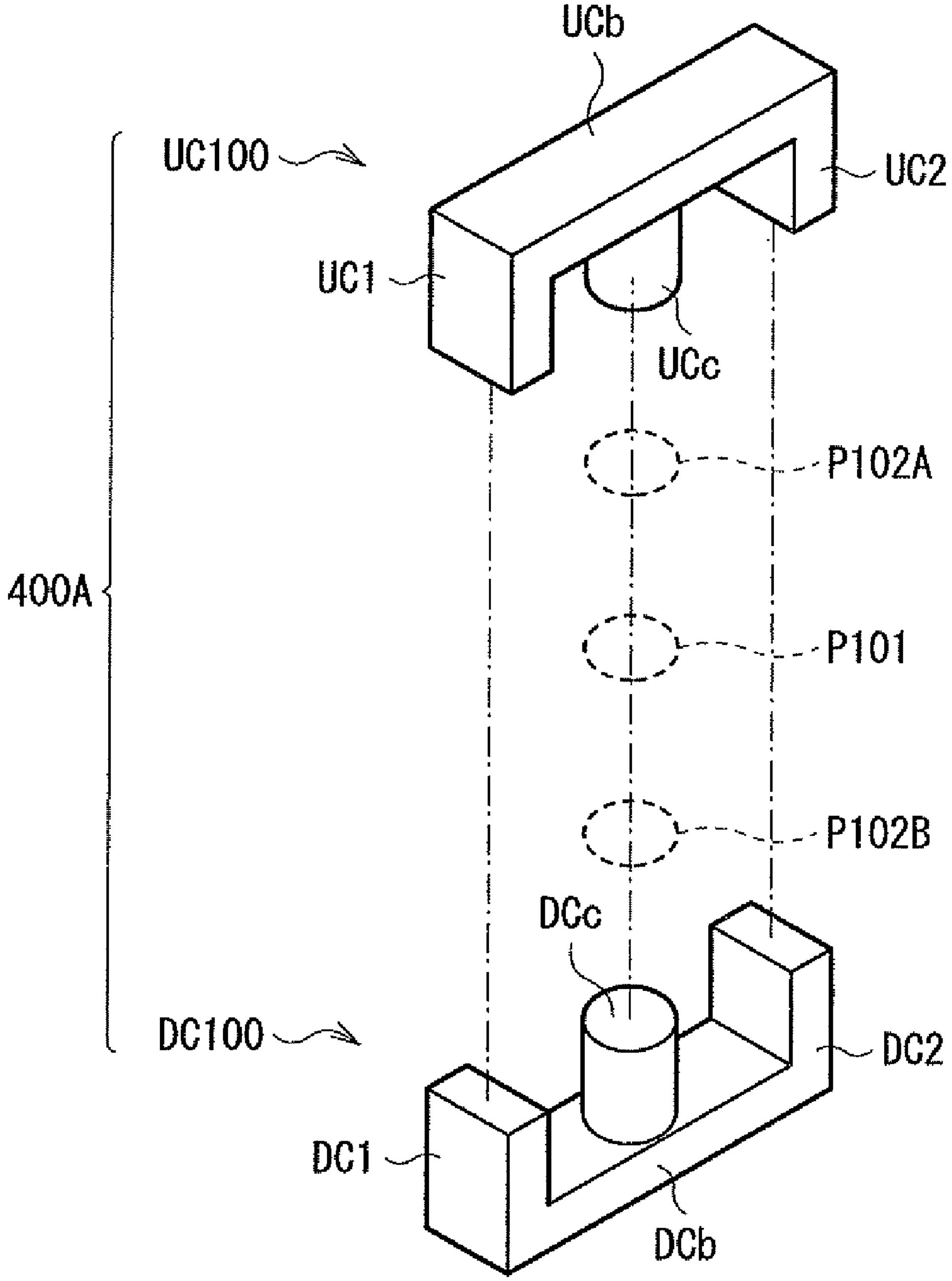
FIG. 7 RELATED ART
FIG. 7 is an exploded perspective view schematically showing an external appearance configuration of the principal part of the transformer according to Comparative Example 1.
Figure 8:
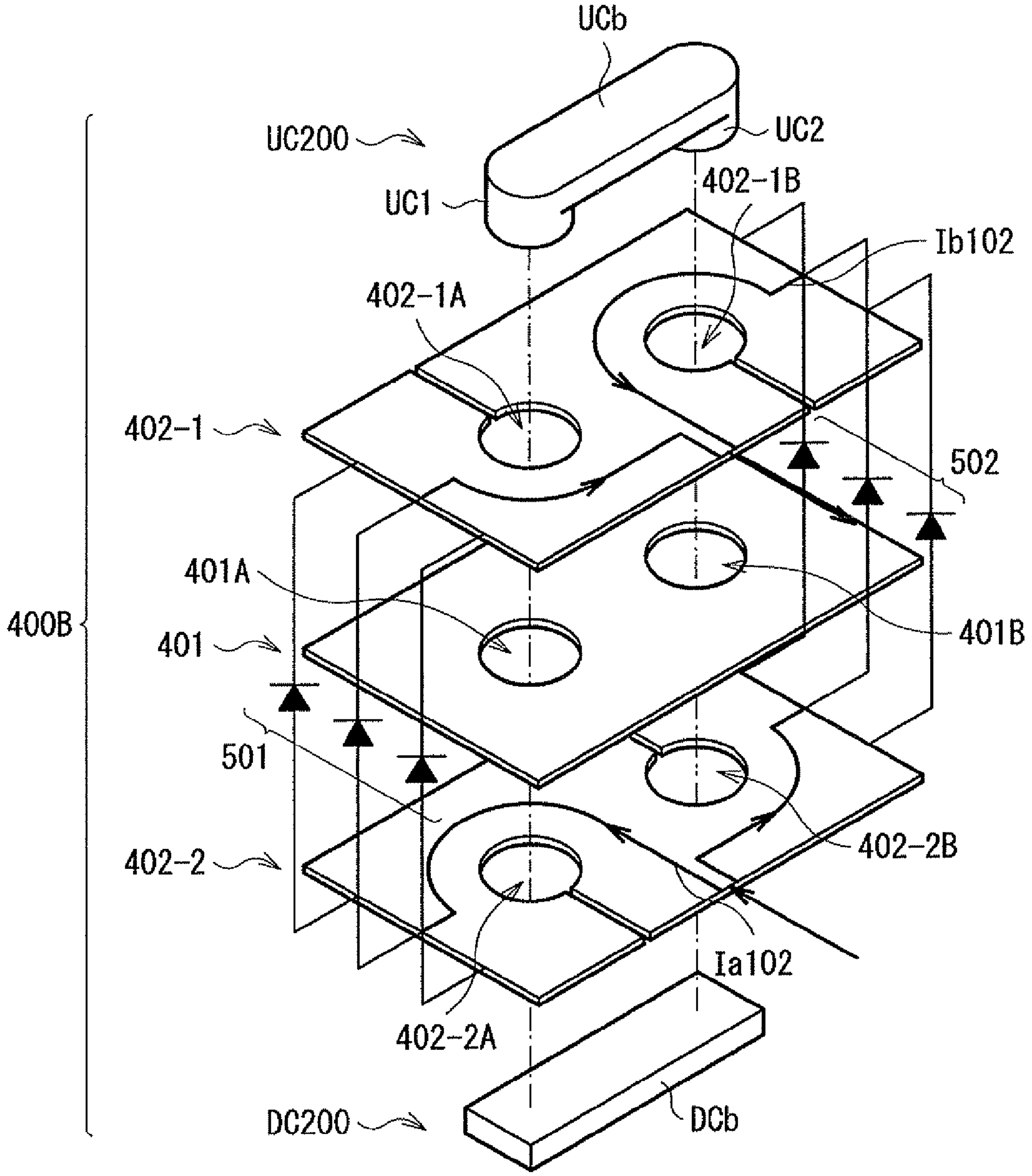
FIG. 8 RELATED ART
FIG. 8 is an exploded perspective view schematically showing an external appearance configuration of the principal part of the transformer according to Comparative Example 2.

Subsequently, functions of a characteristic portion of the switching power supply unit according to an embodiment of the present embodiment will be described in detail with reference to FIGS. 7 to 9 in addition to FIGS. 2 to 4, as compared with comparative examples. Here, FIG. 7 is an exploded perspective view schematically showing an external appearance configuration of the principal part of a transformer 400A according to Comparative example 1. FIG. 8 is an exploded perspective view schematically showing an external appearance configuration of the principal part of a transformer 40013 according to Comparative example 2.

First, the transformer 400A according to Comparative example 1 of FIG. 7 is configured from an E-shaped core (EE core) having an upper core UC100 and a lower core DC100 that constitute the magnetic core. The upper core UC100 includes a base core UCb, one middle leg UCc, and two outer legs UC1 and UC2, and the lower core DC100 includes a base core DCb, one middle leg DCc, and two outer legs DC1 and DC2. A primary winding P101 and secondary windings P102A and P102B are wound around the periphery of the middle legs UCc and DCc (between the outer legs UC1 and UC2, DC1 and DC2).

On the other hand, a transformer 400B according to Comparative example 2 of FIG. 8 is configured from a U-shaped core (U1 core) having an upper core UC200 and a lower core DC200 that constitute the magnetic core. The upper core UC200 includes a base core UCb and two leg portions UC1 and UC2, and the lower core DC200 includes a base core DCb and two leg portions DC1 and DC2. A printed coil 401 has two through-holes 401A and 401B and constitutes a primary winding. A metal plate 402-1 has two through-holes 402-1A and 402-1B, and a metal plate 402-2 has two through-holes 402-2A and 402-2B, and these two metal plates 402-1 and 402-2 constitute secondary windings. Rectifier diodes 501 and 502 that constitute a rectifier circuit are connected between the metal plates 402-1 and 402-2.

Here, since such transformer 400B using a U-shaped magnetic core like Comparative example 2 makes it possible to expand a radiation path on the side of the secondary windings compared with the transformer 400A in which an E-shaped core is employed like Comparative example 1, the temperature of windings may be lowered. That enables the switching power supply unit, as a whole unit, to deal with a big current without parallel operation of a plurality of inverter circuits and so on.

However, employment of such U-shaped core needs larger thickness in its upper core and lower core compared with the case where an E-shaped core is employed, and thus it is difficult to decrease the height of the core. The reason thereof may be given hereinbelow. Namely, first, when the E-shaped core is employed under the condition that the E-shaped core and the U-shaped core have an equal width and cross-section area, the cross-section area of the upper core is half of that of the middle leg because the flux path is split into two in the upper core. Meanwhile, when the U-shaped core is employed, the leg portions and the upper core have an equal cross-section area because of the single flux path. Second, since the magnetic flux in the U-shaped core is liable to concentrate in vicinity to the inner surface thereof, when the core width of the U-shaped core is equal to that of the E-shaped core, the thickness of the U-shaped core needs to be still larger to decrease the flux density.

In addition, since the U-shaped core is required to take a wider interval between the two leg portions UC1 and UC2, when a radiation path is limited in the longitudinal direction of a base plate (base core DCb) as a heat sink, the thermal resistance in the radiation path from the center portion of upper core UC200 to a coolant becomes high. Thus the center portion (base core UCb) of the upper core UC200 is liable to be high in temperature. Here, if the core temperature becomes high, saturation flux density decreases to a state of magnetic saturation so that the switching element may be broken down and deterioration of materials may be promoted. In particular, since the deterioration of insulating material results in the breakdown of insulation in an insulating transformer, that may be a critical problem of product life cycle and product safety. Thus in order to reduce the core loss and lower the thermal resistance, it is necessary to further increase the core size to decrease the flux density and thermal resistance. However, that may then increase the size in apparatus and production cost.

Further, the core loss has a temperature dependency such that it decreases within a range from ordinary temperature to a certain temperature and then begins to increase above the certain temperature. If the apparatus continues to be operated even when the temperature exceeds the minimum core loss point at the certain temperature, a thermorunaway may occur due to the ill-balance between the increasing temperature and heat radiation (cooling) because the higher the temperature becomes, the more increases the core loss.

What is more, if a ferrite core is employed, for example, it comes to be difficult to radiate heat due to the core loss generated inside the ferrite core, since ferrite has a lower thermal conductivity than that of copper and aluminum.

As mentioned above, in the transformers 400A and 400B that employ the E-shaped core and the U-shaped core of related art according to Comparative examples 1 and 2 respectively, it is difficult to realize both the reduction in height (miniaturization) and enlargement in radiation path simultaneously. As a result, it is also difficult to reduce cost while increasing reliability.

Accordingly, as shown in FIGS. 3 and 4, according to the transformer 4 of the present embodiment, direction of the magnetic flux formed in the four leg portions UC1 to UC4 and DC1 to DC4 is determined so as to be directed in a same direction in the first leg portion in pair, which is constituted from the first leg portions UC1 and DC1 and the third leg portions UC3 and DC3, and also directed in a same direction in the second leg portion pair, which is constituted from the second leg portions UC2 and DC2 and the fourth leg portions UC4 and DC4. The magnetic flux of the first leg portion pair and the magnetic flux of the second leg portion pair are directed opposite to each other. In other words, both of the magnetic fluxes produced inside the first leg portions UC1 and DC1 and the third leg portions UC3 and DC3 are directed in the first direction while both of the magnetic fluxes produced inside the second leg portions UC2 and DC2 and the fourth leg portions UC4 and DC4 are directed in the second direction opposite to the above-mentioned first direction.

Figure 9A:
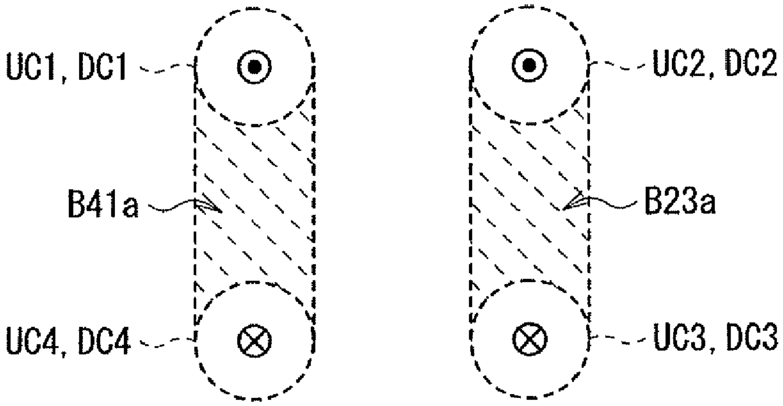
FIGS. 9A and 9B are planar schematic diagrams to explain the operation of the transformer illustrated in FIG. 3.
Figure 9B:
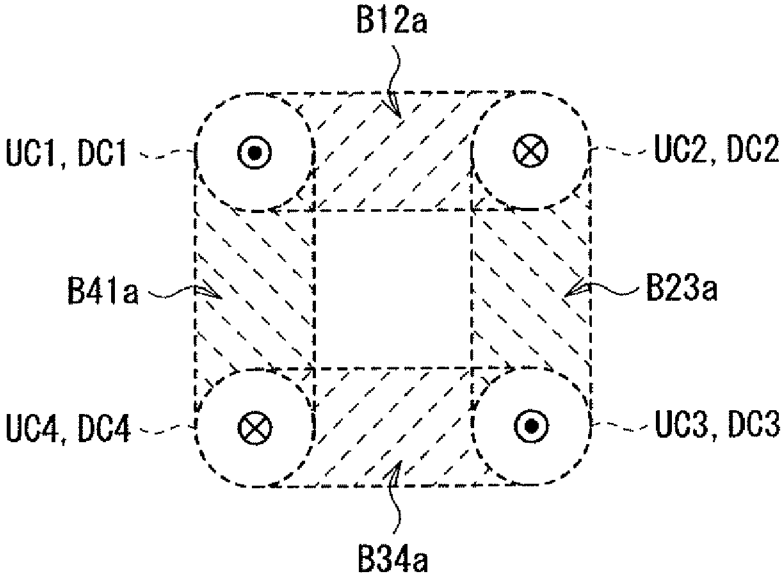

When the primary windings 41A to 41D and the secondary windings 42A to 42D are wound around to make the magnetic flux directed in this manner, as shown in FIGS. 4 and 9B for example, four annular magnetic paths are formed, such as the annular magnetic paths B12*a* and B12*b* passing through the inside of the first leg portions UC1 and DC1 and the second leg portions UC2 and DC2, the annular magnetic paths B23*a* and B23*b* passing through the inside of the second leg portions UC2 and DC2 and the third leg portions UC3 and DC3, the annular magnetic paths B34*a* and B34*b* passing through the inside of the third leg portions UC3 and DC3 and the fourth leg portions UC4 and DC4, and the annular magnetic paths B41*a* and B41*b* passing through the inside of the fourth leg portions UC4 and DC4 and the first leg portions UC1 and DC1. The formation area of these four annular magnetic paths B12*a*, B12*b*, B23*a*, B23*b*, B34*a*, B34*b*, B41*a* and B41*b* come to go around the four leg portions UC1 to UC4 and DC1 to DC4 on the base cores UCb and DCb. Namely, the annular magnetic paths B12*a*, B12*b* and the annular magnetic paths B41*a*, B41*b* are shared in the first leg portions UC1 and DC1, the annular magnetic paths B12*a*, B12*b* and the annular magnetic paths B23*a*, B23*b* are shared in the second leg portions UC2 and DC2, the annular magnetic paths B23*a*, B23*b* and the annular magnetic paths B34*a*, B34*b* are shared in the third leg portions UC3 and DC3, and the annular magnetic paths B34*a*, B34*b* and the annular magnetic paths B41*a*, B41*b* are shared in the fourth leg portions UC4 and DC4. In other words, four flux paths, each flowing in one direction through adjacent two of the four leg portions UC1 to UC4 and DC1 to DC4 and through the two base cores UCb and DCb, are formed in the four leg portions UC1 to UC4 and DC1 to DC4 and the two base cores UCb and DCb.

Accordingly, as compared with a case where, for example, the direction of the magnetic flux is determined so that only two annular magnetic paths, which are constituted from the annular magnetic paths B41*a* and B41*b* passing through the inside of the first leg portions UC1 and DC1 and the fourth leg portions UC4 and DC4, and the annular magnetic paths B23*a* and B23*b* passing through the inside of the second leg portions UC2 and DC2 and the third leg portions UC3 and DC3, may be formed as shown in FIG. 9A (corresponding to a case where two U-shaped cores of Comparative 2 are used), the magnetic flux in the magnetic core 40 is dispersed, and thus flux density can be reduced and core loss can be decreased. In addition, since a radiation path is expanded compared with the case of Comparative example 1 in which the E-shaped core is employed, cooling of the magnetic core 40, the primary windings 41A to 41D and the secondary windings 42A to 42D gets more easy.

As mentioned above, according to the present embodiment, the primary windings 41A to 41D and the secondary windings 42A to 42D are wound around so that the magnetic fluxes formed in the penetrating direction in the four leg portions UC1 to DC4 and DC1 to DC4 may be directed in a same direction in the first leg portion pair constituted from the first leg portions UC1, DC1 and the third leg portions UC3, DC3 while directed in a same direction in the second leg portion pair constituted from the second leg portions UC2, DC2 and the fourth leg portions UC4, DC4. Here, the first and the second leg portion pairs are directed opposite to each other in the magnetic flux. Thus, the four annular magnetic paths B12*a*, B12*b*, B23*a*, B23*b*, B34*a*, B34*b*, B41*a* and B41 are formed as described above, and the formation area of the four annular magnetic paths comes to go around the four leg portions UC1 to UC4 and DC1 to DC4 on the base core UCb and DCb. In other words, according to the present embodiment, the primary windings 41A to 41D and the secondary windings 42A to 42D are wound around so that both of the magnetic fluxes produced inside the first leg portions UC1 DC1 and the third leg portions UC3 and DC3 may be directed in the first direction, while both of the magnetic fluxes produced inside the second leg portions UC2 and DC2 and the fourth leg portions UC4 and DC4 may be directed in a direction opposite to the first direction. Thus four flux paths, each flowing in one direction through adjacent two of the four leg portions UC1 to UC4 and DC1 to DC4 and through the two base cores UCb and DCb, are formed inside the four leg portions UC1 to UC4 and DC1 to DC4 and the two base cores UCb and DCb. In this manner, the flux density in the magnetic core 40 can be reduced and core loss can be decreased compared with the case where the U-shaped core is employed. Thus, the height of the core can be lowered by reducing the thickness of the core (thickness of the substrate portion). In addition, since radiation path is expanded compared with the case of the E-shaped core, cooling of the magnetic core 40, the primary winding 41A to 41D and the secondary windings 42A to 42D gets more easy. As a result, cost reduction is available while increasing reliability in production.

In addition, in such configuration, the switching power supply unit, as a whole unit, gets able to deal with a big current without parallel operation of a plurality of inverter circuits 1, transformers 4 and so on. That makes it possible to reduce the number of components, which will also result in the const reduction.

Moreover, since the primary windings 41A to 41D are wound around the four leg portions UC1 to UC4 and DC1 to DC4 one by one in order in the printed coil 410, line capacity may be reduced compared with the case of Modification 1 to be described later, and higher frequency characteristics are available.

In addition, the primary windings 41A to 41D and the secondary windings 42A to 42D are configured to be each pulled out from outside via wirings (connection lines L21 and L22, output line LO and the ground line LG), in the in-plane direction of the printed coil 410 and the metal plates 421 and 422. Accordingly, the height of the core including wiring can be lowered compared with a case where such wiring is pulled out in a direction vertical to the plane of the printed coil 410 and the metal plates 421 and 422 while the pullout structure of the wiring becomes simple.

[Modification]

Subsequently, some examples of modification according to the present invention will be explained hereinbelow. Here, the same reference numerals as in the above embodiment have been used to indicate substantially identical components, and descriptions will be appropriately omitted.

(Modification 1)

Figure 10:
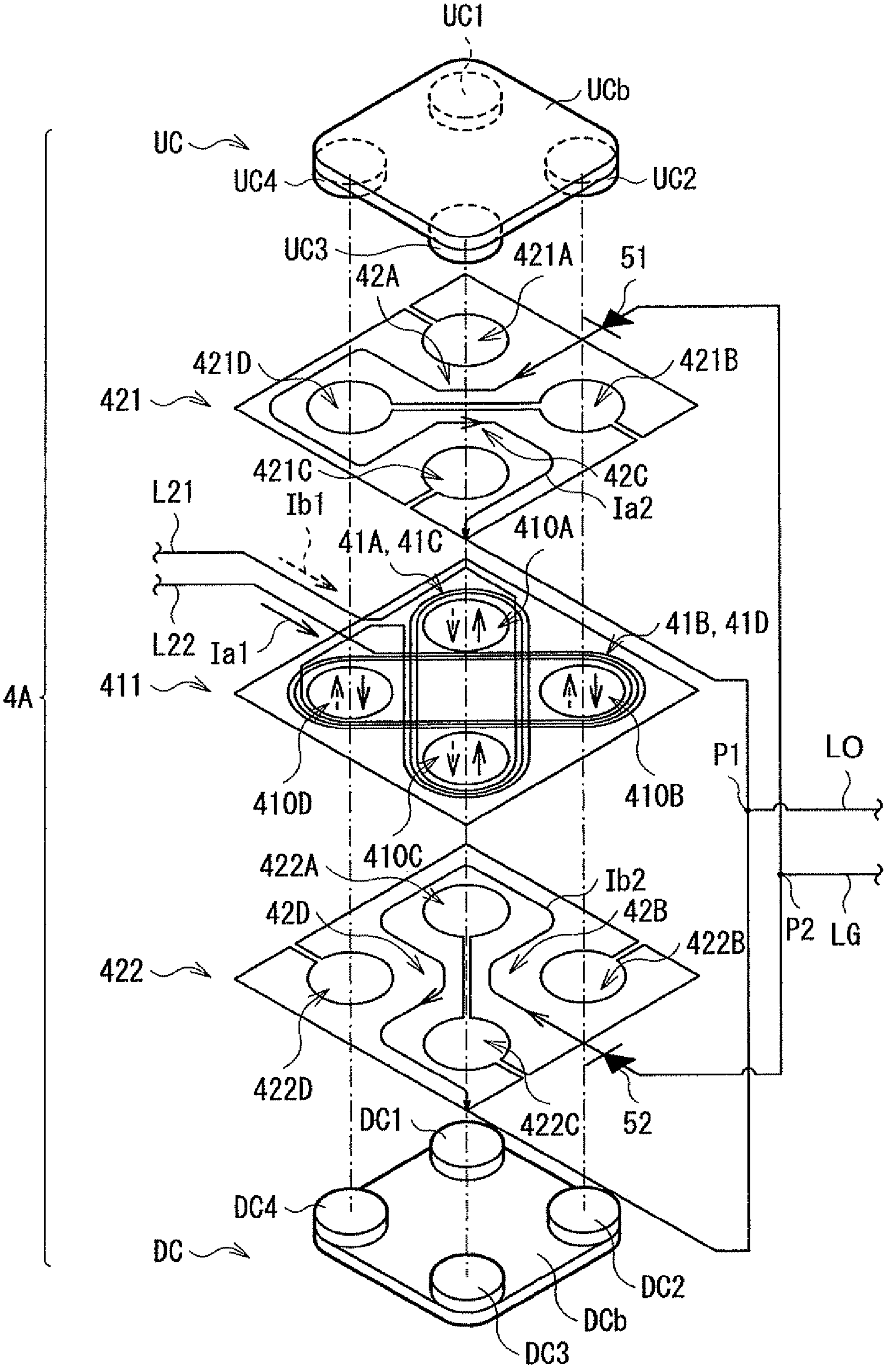
FIG. 10 is an exploded perspective view showing the external appearance configuration of the principal part of a transformer according to Modification 1 of the present invention.

FIG. 10 is an exploded perspective view showing an external appearance configuration of the principal part of a transformer 4A according to Modification 1 of the present invention. In the transformer 4A, a printed coil 411 is used in substitution for the printed coil 410 used in the transformer 4 of the above-mentioned embodiment.

In the printed coil 411, primary windings 41A to 41D are wound around a first leg portion pair that is constituted from first leg portions UC1, DC1 and third leg portions UC3, DC3 and then wound around a second leg portion pair that is constituted from second leg portions UC2, DC2 and fourth leg portions UC4, DC4 one by one in order.

Also in this modification, effects similar to those of the above-mentioned embodiment are available due to the similar function thereof. Namely, cost reduction can be realized while increasing reliability of products.

(Modification 2)

Figure 11:
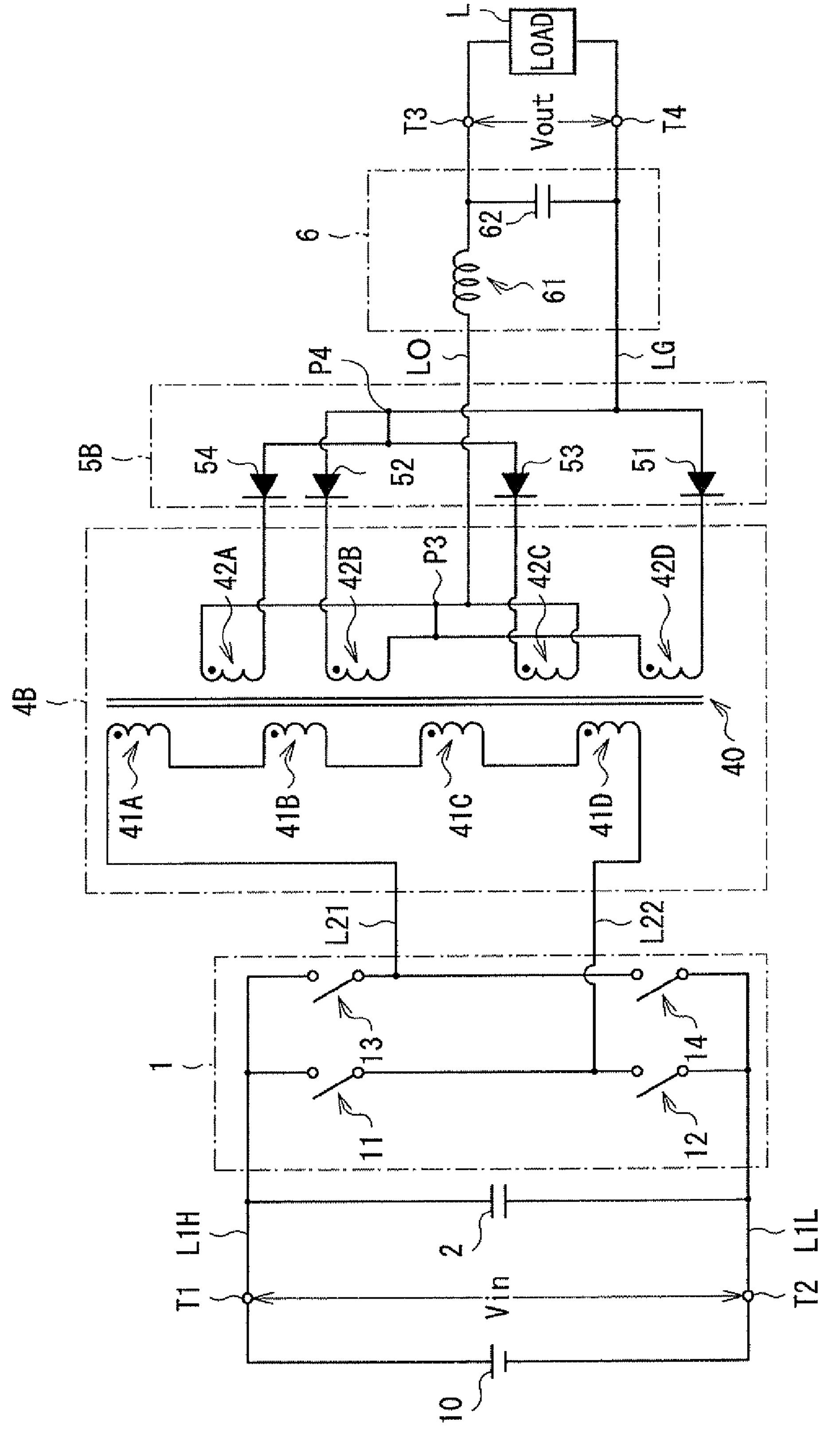
FIG. 11 is a circuit diagram showing a configuration of a switching power supply unit according to Modification 2 of the present invention.

FIG. 11 is a circuit diagram of a switching power supply unit according to Modification 2 of the present invention. In the switching power supply unit of the present modification, a transformer 4B and a rectifier circuit 5B are employed in substitution for the transformer 4 and the rectifier circuit 5 of the switching power supply unit according to the above-mentioned embodiment.

The transformer 4B has a magnetic core 40, four primary windings 41A to 41D, and four secondary windings 42A to 42D as with the transformer 4. However, connection state of the secondary windings 42A to 42D in the transformer 413 is different from that of the transformer 4. The rectifier circuit 513 has a configuration of anode common connection of a center tap type, which is provided with four rectifier diodes 51 to 54 unlike the rectifier circuit 5.

In these transformer 4B and rectifier circuit 513, one end of the secondary winding 42A is connected to the cathode of the rectifier diode 54, and the other end thereof is connected to a connection point (center tap) P3. One end of the secondary winding 42B is connected to the cathode of the rectifier diode 52, and the other end is connected to the center tap P3. One end of the secondary winding 42C is connected to the cathode of the rectifier diode 53, and the other end is connected to the center tap P3. One end of the secondary winding 42D is connected to the cathode of the rectifier diode 51, and the other end is connected to the center tap P3. The anodes of the rectifier diodes 51 to 54 are mutually connected in the connection point P4 and led to the ground line LG. The center tap P3 is connected to one end of a choke coil 61 in the smoothing circuit 6 via an output line LO.

Figure 12:
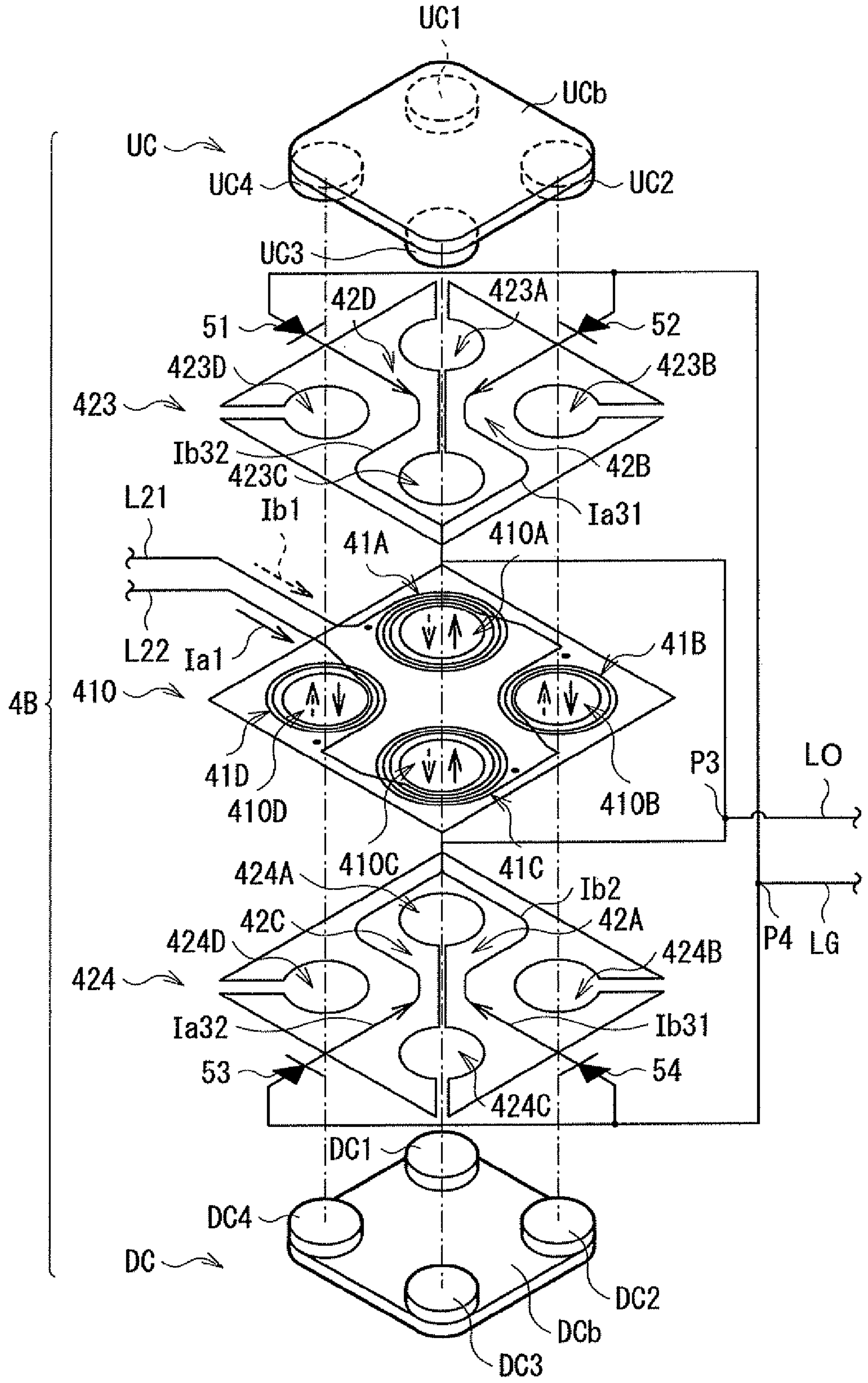
FIG. 12 is an exploded perspective view showing an external appearance configuration of the principal part of the transformer illustrated in FIG. 11.

Subsequently, FIG. 12 is an exploded perspective view showing an external appearance configuration of the principal part of the transformer 4B according to the present modification. The transformer 4A?(4B?) is configured such that metal plates 423 and 424 are provided therein instead of the metal plates 421 and 422 of the transformer 4 according to the above-mentioned embodiment.

In the two metal plates 423 and 424, a second pair of windings are wound around so as to be connected in parallel each other. Specifically, in the metal plate 423, the secondary winding 42D that is wound around the fourth leg portion UC4 and DC4 from the cathode side of the diode 51 toward the connection point P3 on the output line LO and the secondary winding 42B that is wound around the second leg portions UC2 and DC2 from the cathode side of the diode 52 toward the connection point P3 on the output line LO are connected in parallel to each other. Meanwhile, in the metal plate 424, the secondary winding 42C that is wound around the third leg portions UC3 and DC3 from the cathode side of the diode 53 toward the connection point P3 on the output line LO and the secondary winding 42A that is wound around the first leg portions UC1 and DC1 from the cathode side of the diode 54 toward the connection point P3 on the output line LO are connected in parallel to each other.

In the switching power supply unit according to the present modification, as with the above-mentioned embodiment, the ON-period of the switching elements 11 and 14 and the ON-period of the switching elements 12 and 13 repeatedly alternates in the inverter circuit 1. Accordingly, operation of the switching power supply unit will be described in detail as follows.

Figure 13:
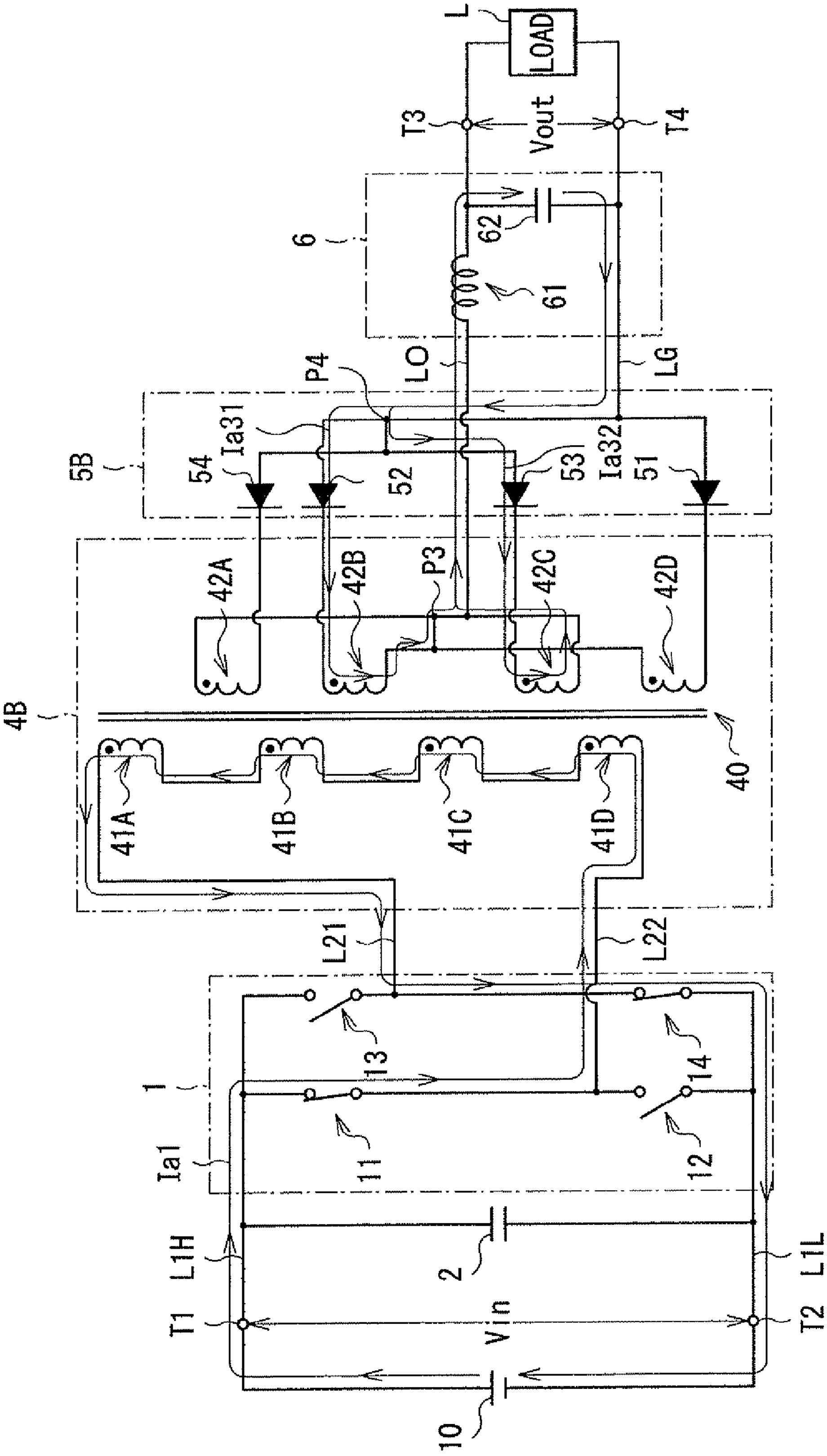
FIG. 13 is a circuit diagram to explain the basic operation of the switching power supply unit of FIG. 11.

First, as shown in FIG. 13, when the switching elements 11 and 14 of the inverter circuit 1 are turned on, a primary side mesh-current Ia1 flows through the primary windings 41D to 41A in a direction from the switching element 11 toward the switching element 14 as with the above-mentioned embodiment. Here, voltages each appearing in the secondary windings 42A to 42D of the transformer 4B are opposite in direction to the rectifier diodes 51 and 54, while forward in direction with respect to that of the rectifier diodes 52 and 53. Accordingly, as shown in the figure, a secondary mesh-current Ia31 flows from the rectifier diode 52 through the secondary winding 42B and choke coil 61 to the output smoothing capacitor 62 in order. Similarly, as shown in the figure, a secondary mesh-current Ia32 flows from the rectifier diode 53 through the secondary windings 42C and the choke coil 61 to the output smoothing capacitor 62 in order. Thus a DC output voltage Vout is supplied to a low voltage battery (not shown) due to these secondary mesh-currents Ia31 and Ia32, and a load L is driven.

Figure 14:
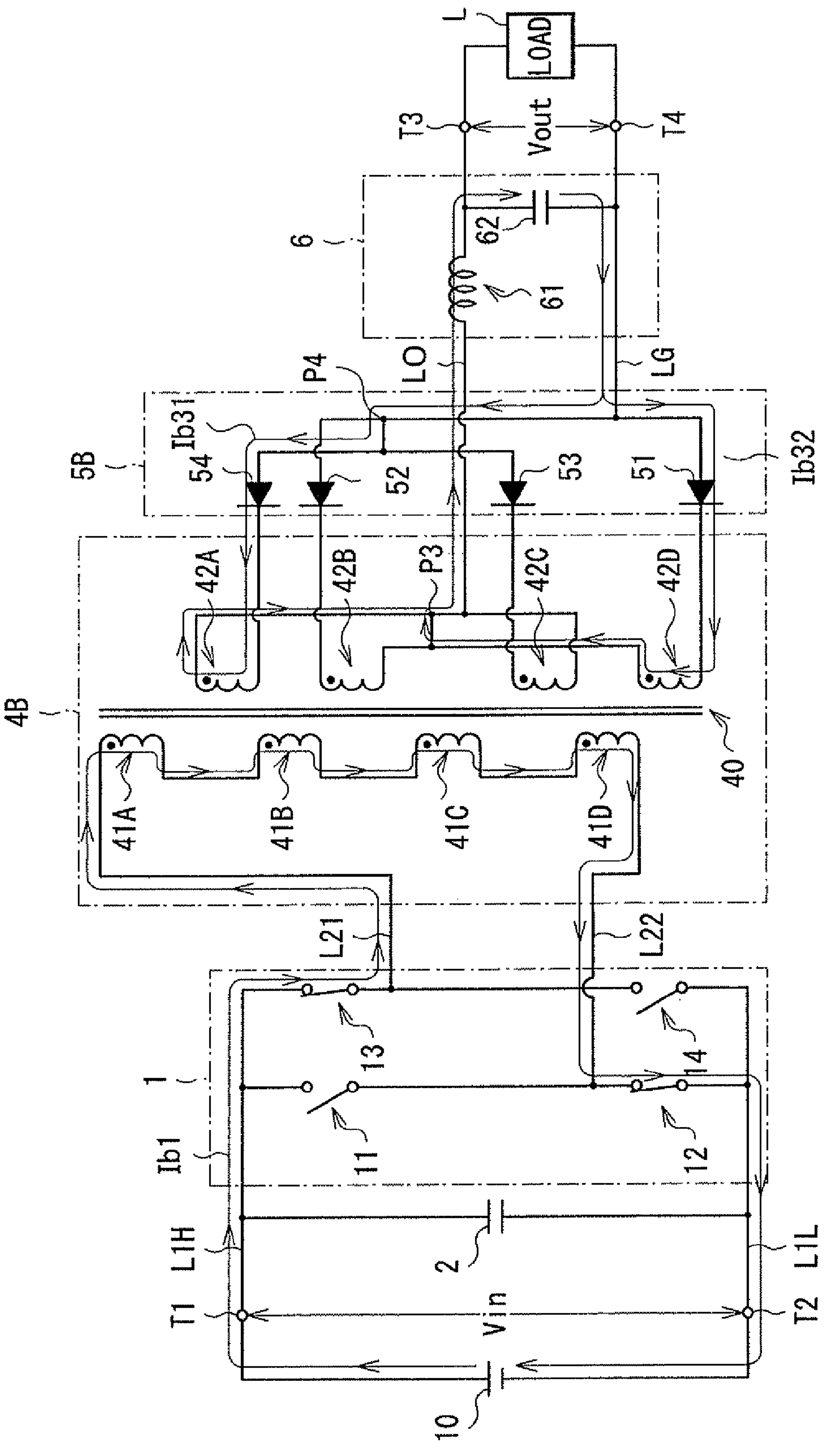
FIG. 14 is a circuit diagram to explain the basic operation of the switching power supply unit of FIG. 11.

Meanwhile, as shown in FIG. 14, when the switching elements 11 and 14 of the inverter circuit 1 are turned off and the switching elements 12 and 13 of the inverter circuit 1 are turned on, a primary side mesh-current Ib1 flows through the primary windings 41A to 41D in a direction from the switching element 13 toward the switching element 12 as with the above-mentioned embodiment. At that time, voltages each appearing in the secondary windings 42A to 42D of the transformer 48 are opposite in direction to that of the rectifier diodes 52 and 53, while forward in direction with respect to that of the rectifier diodes 51 and 54. Accordingly, a secondary mesh-current Ib31 flows from the rectifier diode 54 through the secondary winding 42A and the choke coil 61 to the output smoothing capacitor 62 in order. Similarly, as shown in the figure, a secondary mesh-current Ib32 flows from the rectifier diode 51 through the secondary windings 42D and the choke coil 61 to the output smoothing capacitor 62 in order. Thus a DC output voltage Vout is supplied to a low voltage battery (not shown) due to these secondary mesh-currents Ib31 and Ib32, and the load L is driven.

Also in this modification, effects similar to those of the above-mentioned embodiment are available due to the similar function thereof. Namely, cost reduction can be realized while increasing reliability of products.

(Modifications 3 and 4)

In the transformer 4B and the rectifier circuit 5B according to Modification 2, one of the two metal plates 423 and 424 that constitute the secondary windings 42A to 42D may not be disposed.

Figure 15:
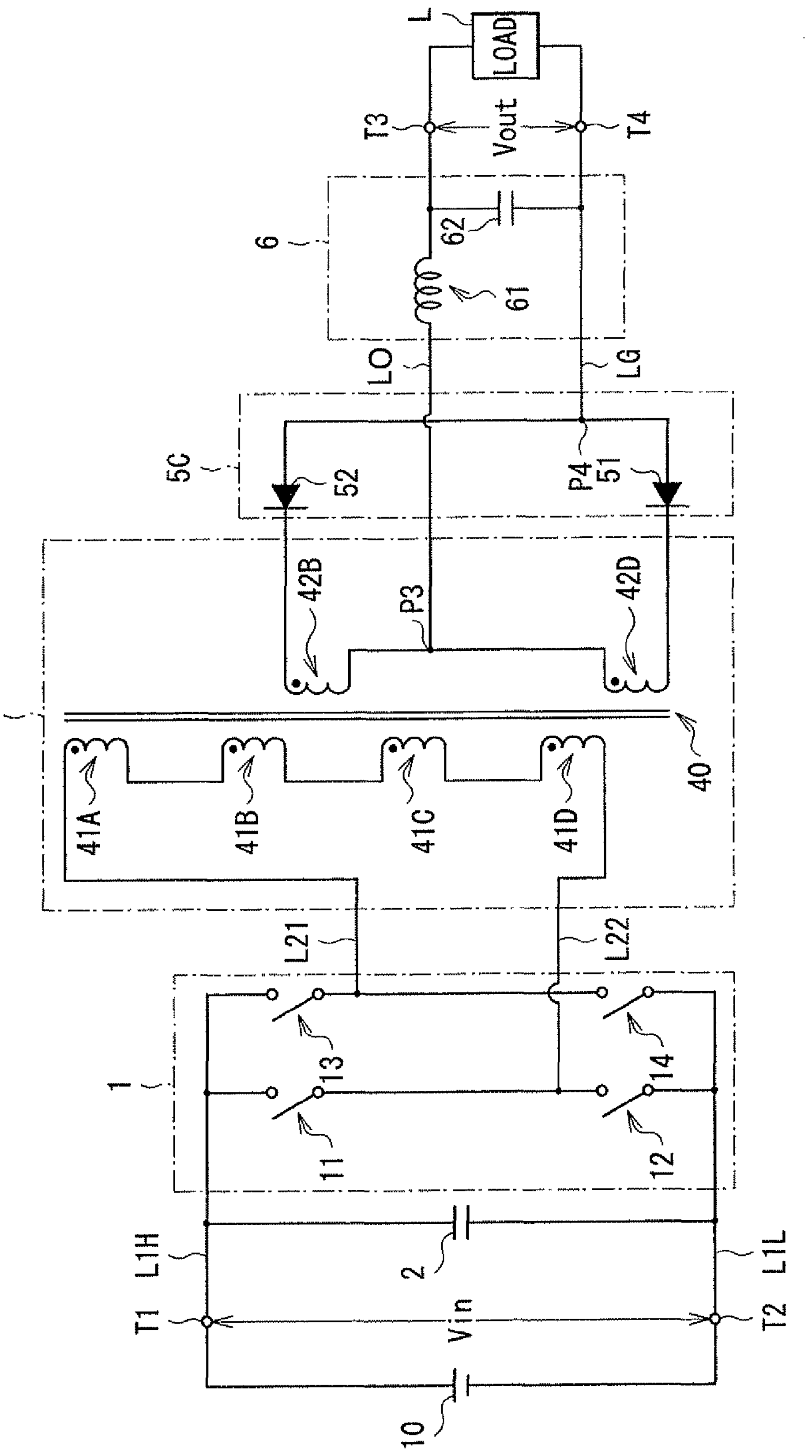
FIG. 15 is a circuit diagram showing a configuration of a switching power supply unit according to Modification 3 of the present invention.
Figure 16:
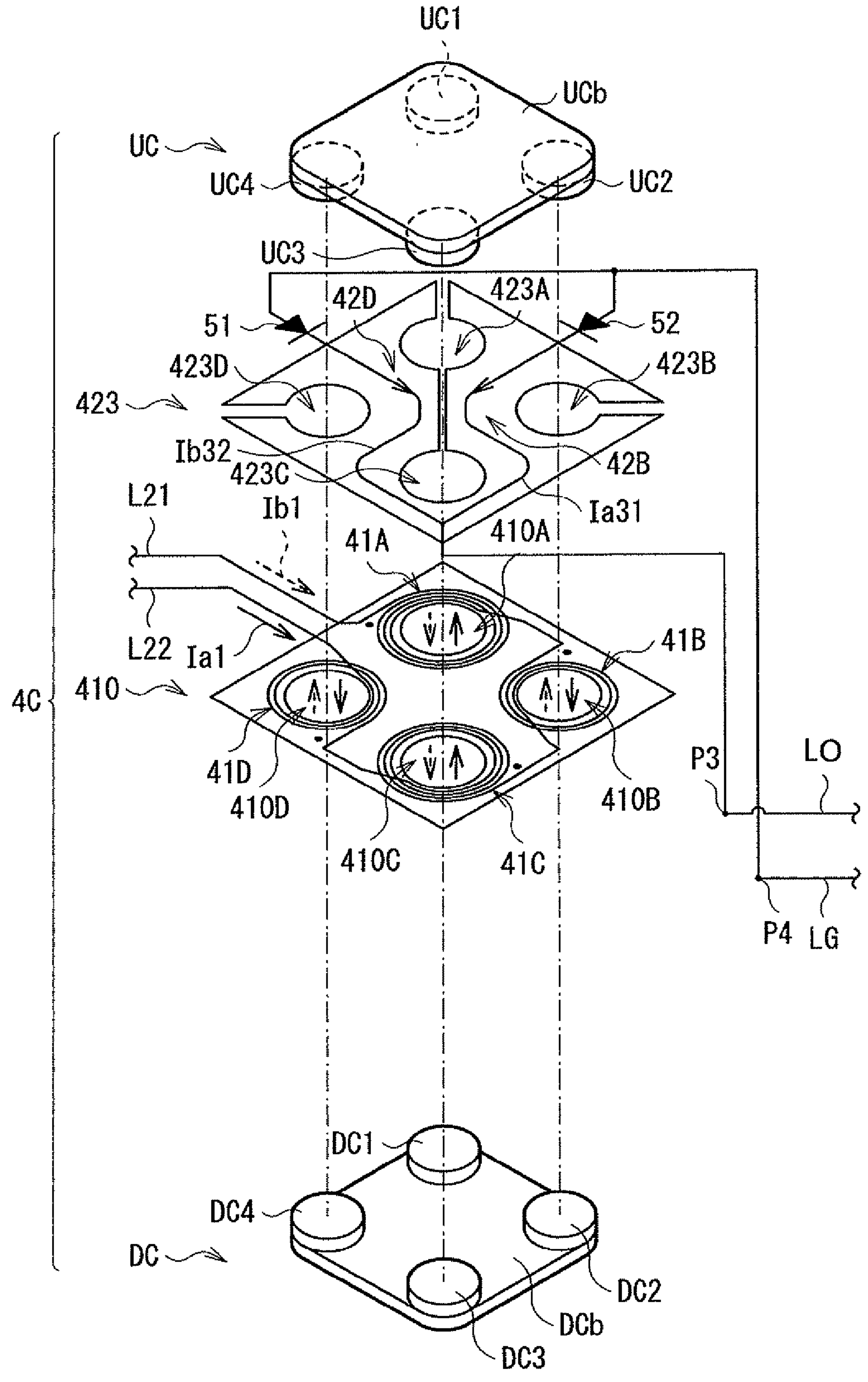
FIG. 16 is an exploded perspective view showing an external appearance configuration of the principal part of the transformer illustrated in FIG. 15.

Namely, as shown by a transformer 4C and a rectifier circuit 5C of FIGS. 15 and 16 according to Modification 3, for example, the metal plate 424 among the metal plates 423 and 424 may not be provided and only the metal plate 423 may be provided. In this configuration, the secondary winding of the transformer 4C only includes the secondary windings 42B and 42D, and the rectifier circuit 5C only includes two rectifier diodes 51 and 52.

Figure 17:
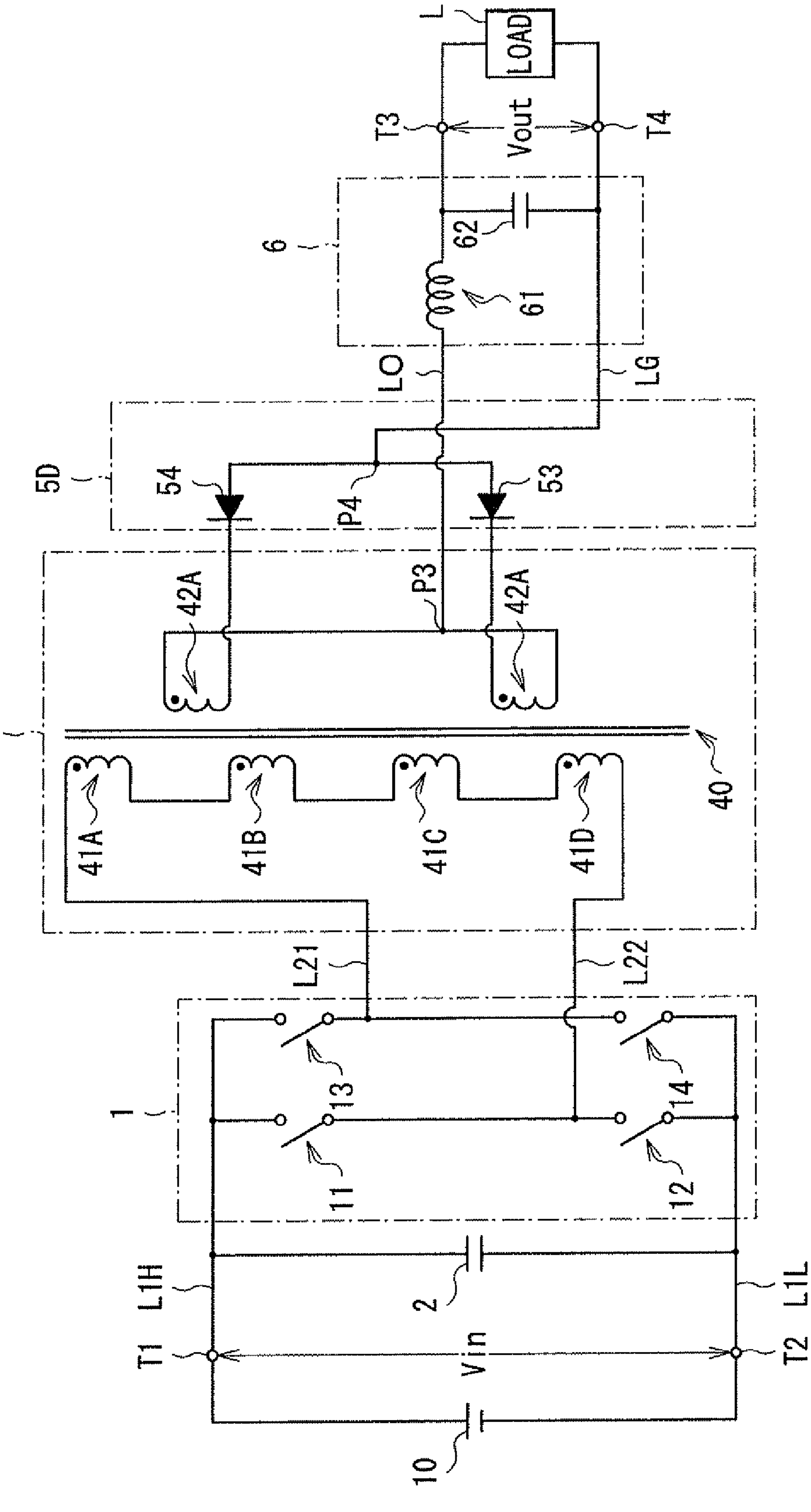
FIG. 17 is a circuit diagram showing a configuration of a switching power supply unit according to Modification 4 of the present invention.
Figure 18:
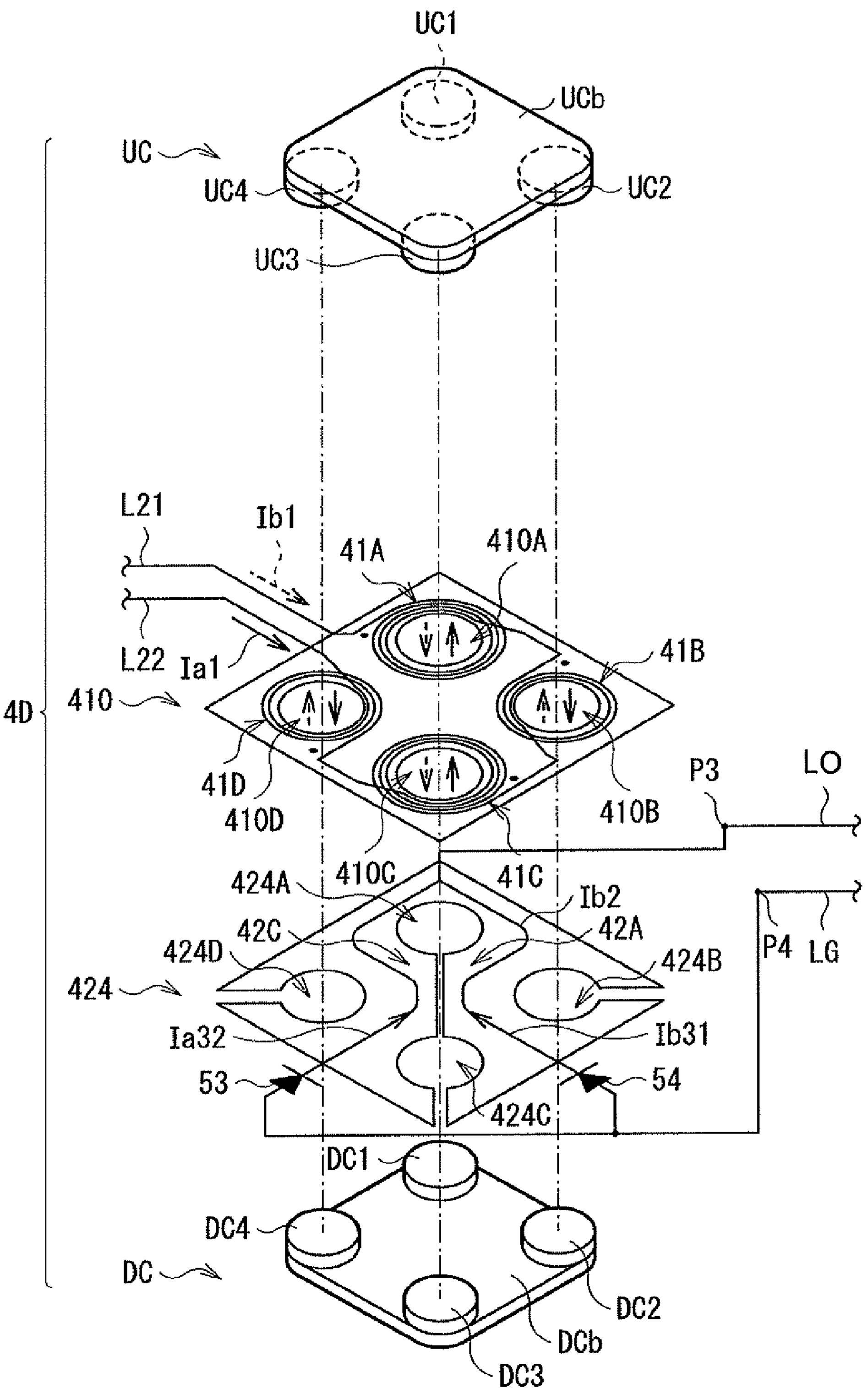
FIG. 18 is an exploded perspective view showing an external appearance configuration of the principal part of the transformer illustrated in FIG. 17.

On the other hand, as shown by a transformer 4D and a rectifier circuit 5D of FIGS. 17 and 18 according to Modification 4, the metal plate 423 among the metal plates 423 and 424 may not be provided and only the metal plate 424 may be provided. In this configuration, the secondary winding of the transformer 4D only includes secondary windings 42A and 42C, and the rectifier circuit 5D only includes two rectifier diodes 53 and 54.

Also in such switching power supply unit configured as mentioned above according to Modifications 3 and 4, effects similar to those of the above-mentioned embodiment are available due to the similar function thereof. Namely, cost reduction can be realized while increasing reliability of products.

Further, since one of the two metal plates 423 and 424 that constitute the secondary windings 42A to 42D is not disposed, one side of the printed coil 410 having the primary windings 41A to 41D may also be exposed. As a result, heat can be effectively radiated also from the printed coil 410 compared with the above-mentioned Modification 2, and heat dissipation characteristics are still more improved.

(Modification 5)

Figure 19:
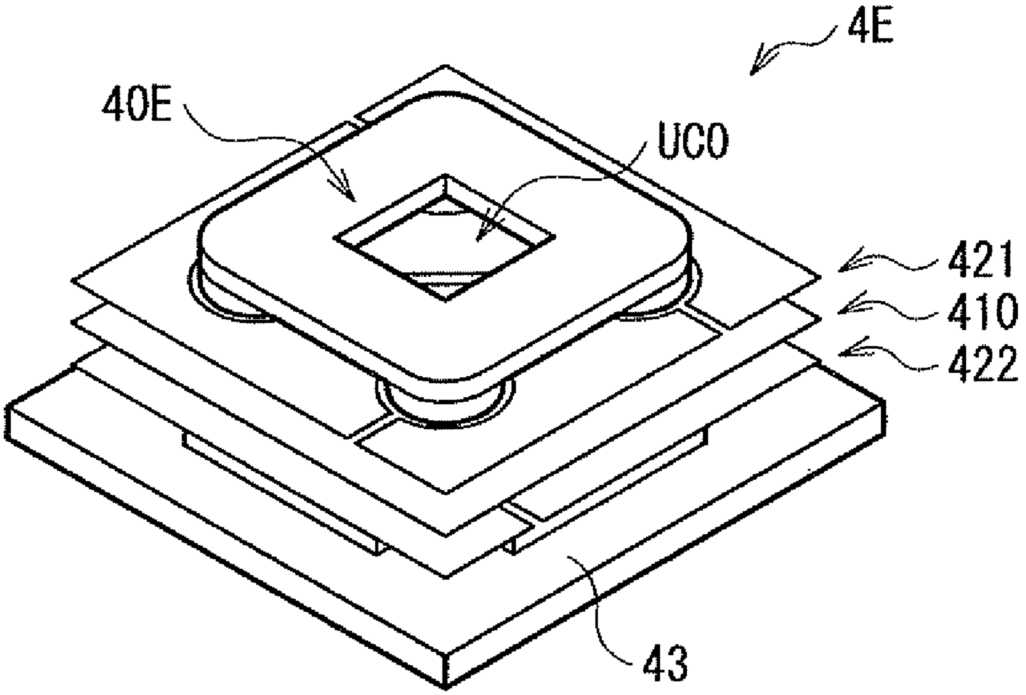
FIG. 19 is a perspective view showing an external appearance configuration of a principal part of a transformer according to Modification 5 of the present invention.
Figure 20:
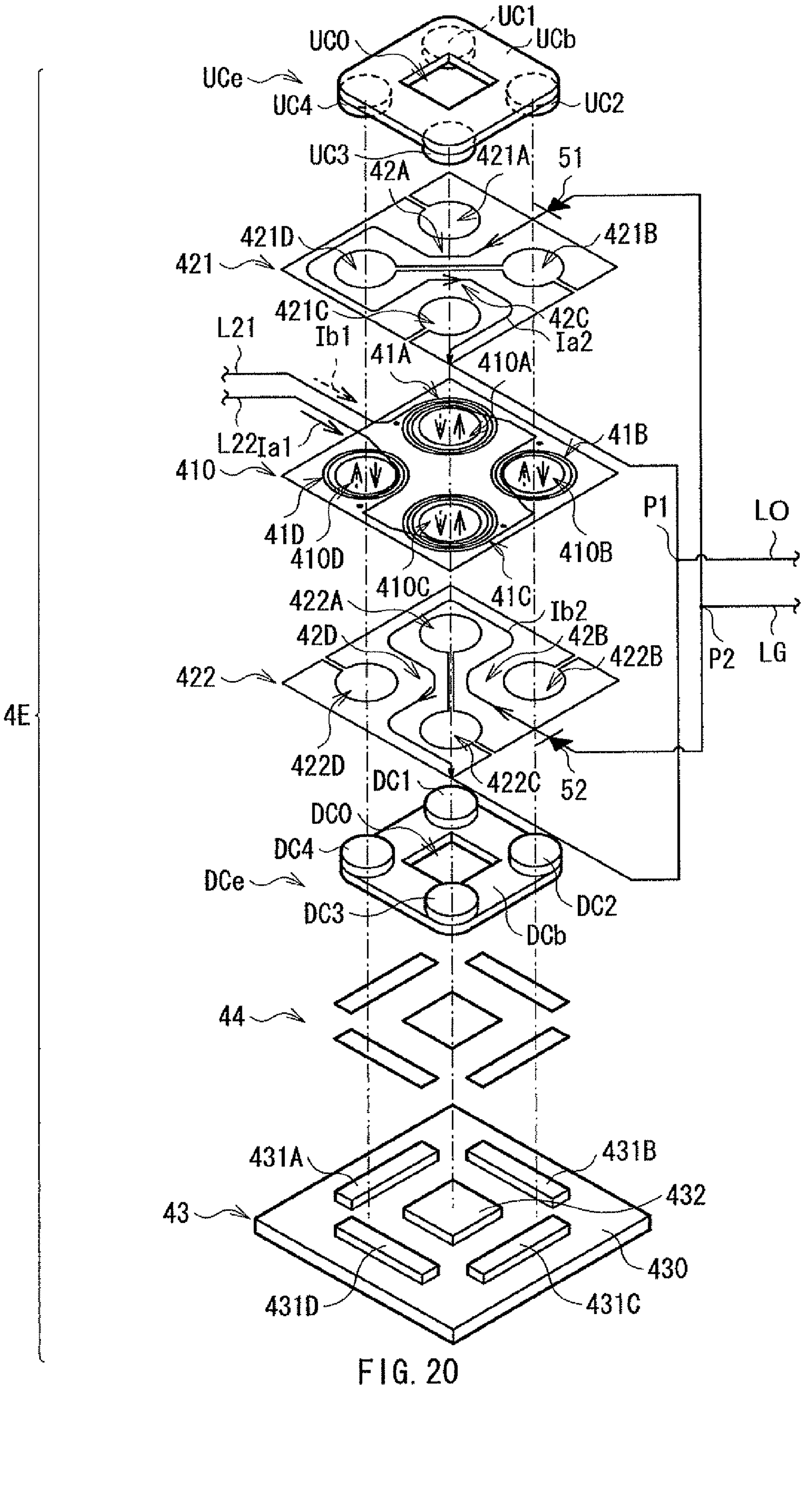
FIG. 20 is an exploded perspective view showing the external appearance configuration of the transformer of FIG. 19.

FIG. 19 is a perspective view of an external appearance configuration of a principal part of a transformer 4E according to Modification 5 of the present invention, and FIG. 20 is an exploded perspective view showing the external appearance configuration of the principal part of the transformer 4E of FIG. 19. The transformer 4E includes a magnetic core 40E that is constituted from an upper core UCe and a lower core DCe instead of the magnetic core 40 constituted from the upper core UC and the lower core DC as with the foregoing embodiments, and further includes a heat sink 43 and an insulating heat dissipating sheet 44, to be described hereinbelow.

The upper core UCe and the lower core DCe include a rectangular (square) opening portions UC0 and DC0 in the central portion surrounded by the four leg portions UC1 to UC4 and DC1 to DC4 respectively.

The heat sink 43 is a heat dissipating member that is disposed under the lower core DCe and made of a metal material having higher thermal conductivity such as aluminum (Al), for example. The insulating heat dissipating sheet 44 is disposed between the heat sink 43 and the lower core DCe, and made of a resin material such as silicone series, for example. The heat sink 43 includes a rectangular (square) base portion (substrate portion) 430 and a plurality of protruding portions 431A, 431B, 431C, 431D and 432. The shape of the base portion 430 is not limited thereto and any other shape thereof is available. The base portion 430 is thermally connected to the lower core DCe via the rectangular protruding portions 431A, 431B, 431C and 431D and a part of the heat dissipating sheet 44 that is shaped corresponding to the protruding portions. Meanwhile, the protruding portion 432 is shaped to be fitted in the opening portion DC0 of the lower core DCe (here, a square opening) and has a thickness corresponding to that of the opening portion DC0, for example. However, there may be a gap between the protruding portion 432 and the opening portion DC0 upon insertion. Namely, it is sufficient if the protruding portion 432 is shaped to be inserted into the opening portion DC0, and may be shaped differently from that of the opening portion DC0. Anyway, it is preferred that the protruding portion 432 be shaped to be fitted in the opening portion DC0 so that positioning between the lower core DCe and the heat sink 43 may be easily determined, as shown in FIG. 20. The protruding portion 432 is thermally connected to a metal plate 422 that constitutes the secondary windings 42A to 42D via a part of the insulating heat dissipating sheet 44, which is shaped here corresponding to the protruding portion 432.

According to the present Modification, the upper core UCe and the lower core DCe includes the cooling (for heat dissipation) opening portions UC0 and DC0 respectively so that heat may be dissipated not only from the peripheral portion of the cores but also from their central portions (heat dissipating area is expanded). Thus heat dissipating characteristics are more improved. In addition, reduction in weight and material cost of the magnetic core 40E (transformer 4E) is also available.

In addition, since the heat sink 43 having the base portion 430 and the protruding portion 432 is provided, heat dissipating area is further expanded and thus the heat dissipating characteristics may be still more improved. However, the base portion 430 and the protruding portion 432 may be provided separately.

In FIG. 20, though the upper core UCe and the lower core DCe both include an opening portion, it may be sufficient if only one of the upper core UCe and the lower core DCe has an opening portion.

When both of the upper core UCe and the lower core DCe have an opening portion as described above, the insulating heat dissipating sheet 44 and the heat sink 43 may be provided not only with the lower DCe side but also with the upper core UCe side.

Further, in FIG. 20, description is made as to a case where the protruding portion 432 is thermally connected to a component member (here, the metal plate 422) of the secondary windings via the insulating sheet 44, the protruding portion 432 may be thermally connected to a component member of the primary windings.

In addition, though the heat sink 43 is taken as an example of the heat dissipating member in FIGS. 19 and 20, it is not limited thereto and other members such as a base plate and a housing (not illustrated) for accommodating the transformer 4E may be used as a heat dissipating member.

(Other Modifications)

Although the present invention has been described above with reference to the embodiment and modifications, the invention is not limited to the embodiment and modifications but can be variously modified.

For example, in the above-mentioned embodiment and so on, although the shape of the primary winding (printed coil) or secondary windings (metal plates) is explained in detail, the shape thereof is not limited thereto and other shapes may be applicable. Further, the primary winding and the secondary windings may be both constituted from either a printed coils or a metal plate.

Figure 21A:
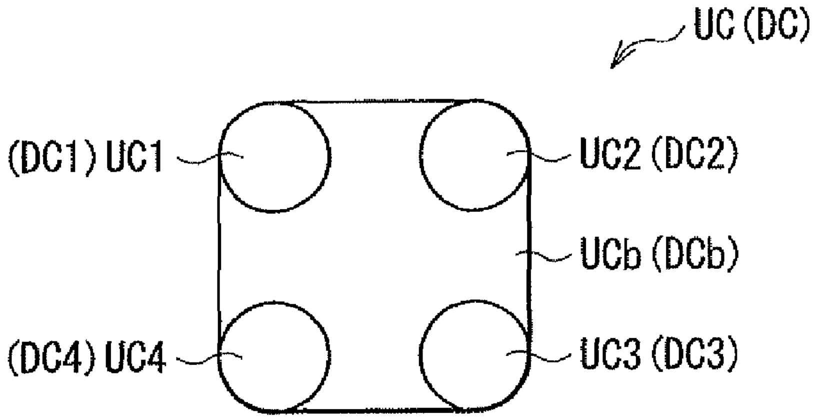
FIGS. 21A to 21C are plan views showing an external appearance configuration of an upper core and a lower core of a transformer according to another Modification of the present invention.
Figure 21B:
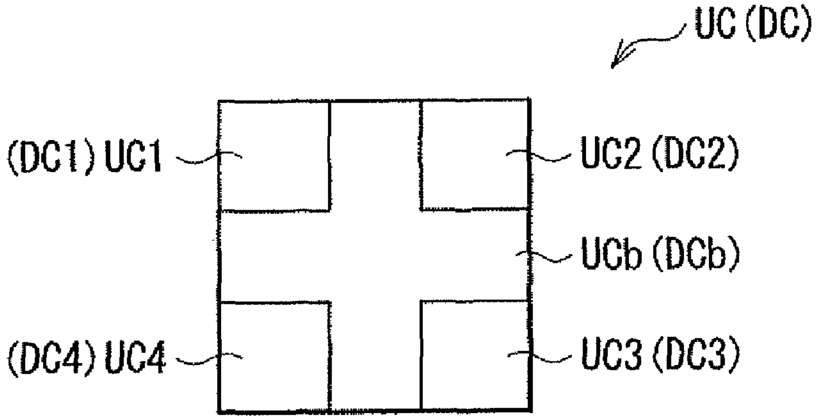
Figure 21C:
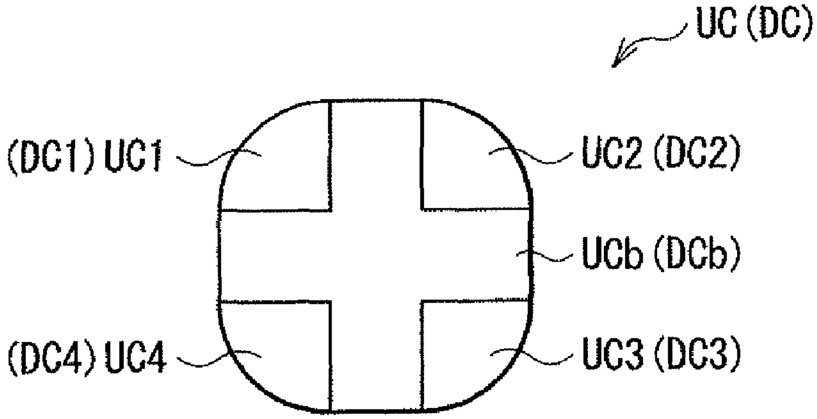
Figure 22A:
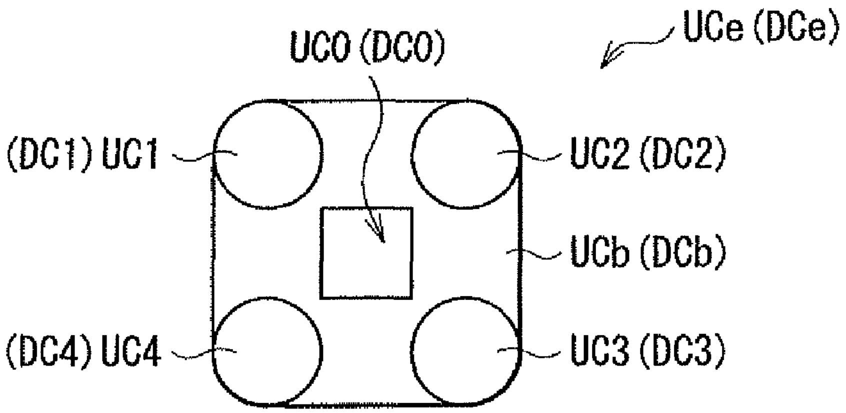
FIGS. 22A to 22C are plan views showing an external appearance configuration of an upper core and a lower core of a transformer according to another Modification of the present invention.
Figure 22B:
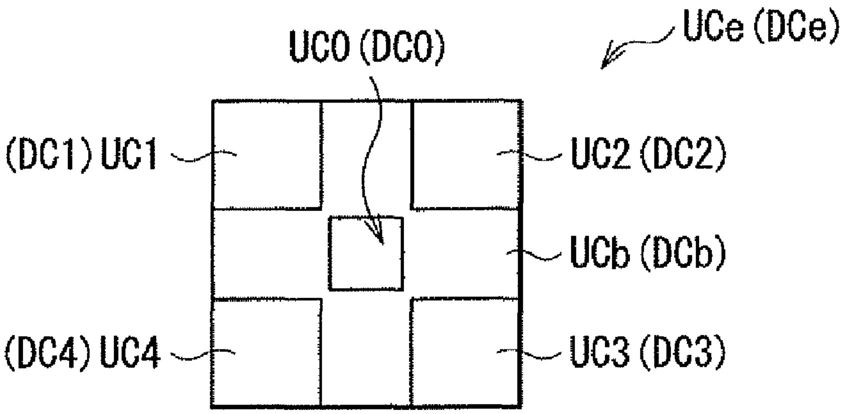
Figure 22C:
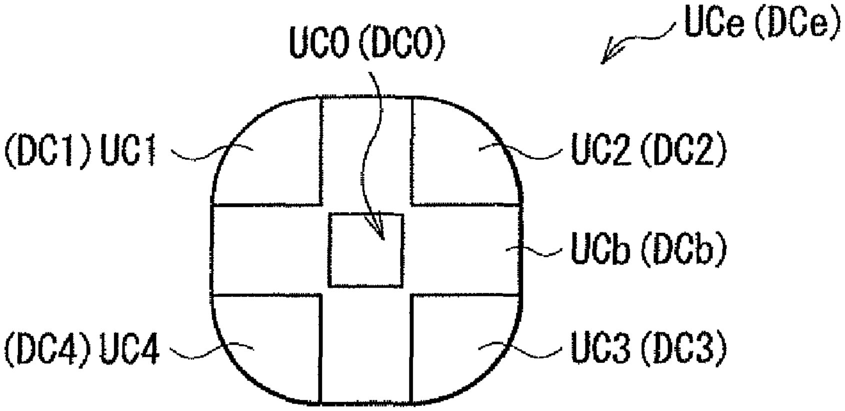

Specifically, according to the above-mentioned embodiments and so on, for example, description is made as to the case in which each side-face of the four leg portions UC1 (DC1) to UC4 (DC4) is a curved surface as shown in the upper cores UC and UCe (lower cores DC and DCe) of FIGS. 21A and 22A, but the side-face geometry of each leg portion is not limited thereto. Specifically, as shown in FIGS. 21B and 21C and FIGS. 22B, 22C, for example, the four leg portions UC1 (DC1) to UC4 (DC4) may be configured such that at least mutually-opposed side-faces are parallelized each other. In such configuration, the flux density in the magnetic cores 40 and 40E is more effectively decreased to improve the reduction of core loss. Further in this case, the outer surface of the four leg portions UC1 (DC1) to UC4 (DC4), which is a surface on a side opposite to the mutually-opposed side-faces, may be a curved surface as shown in FIGS. 21C and 22C, for example. In such configuration, the primary windings and the secondary windings can be wound around the respective leg portions more easily so that the current path is shortened and concentration of current distribution on an angular portion is relieved. By the way, the angular portions on the side-faces of the four leg portions UC1 (DC1) to UC4 (DC4) of FIGS. 21B and 21C and FIGS. 22B and 22C may be chamfered to form a curved surface or a flat surface. The shape and size of the opening portions UC0 and DC0 are not limited to the above-mentioned rectangular (square) one, but various shapes and sizes such as a circle and an elliptical one are also available.

In the above-mentioned embodiment and so on, description is made as to the case in which the four leg portions UC1 (DC1) to UC4 (DC4) are disposed in the four corners of the rectangular (square) base cores UCb and DCb, but it is not always limited thereto. Namely, it may be sufficient if the four leg portions are disposed separately in pairs on the two diagonal lines that are intersecting each other on the base core. What is more, the shape and size of the base cores is not limited to rectangle (square) as shown in the above-mentioned embodiments and so on, and any other shape and size may be available as long as it functions as a substrate of the four leg portions.

Figure 23:
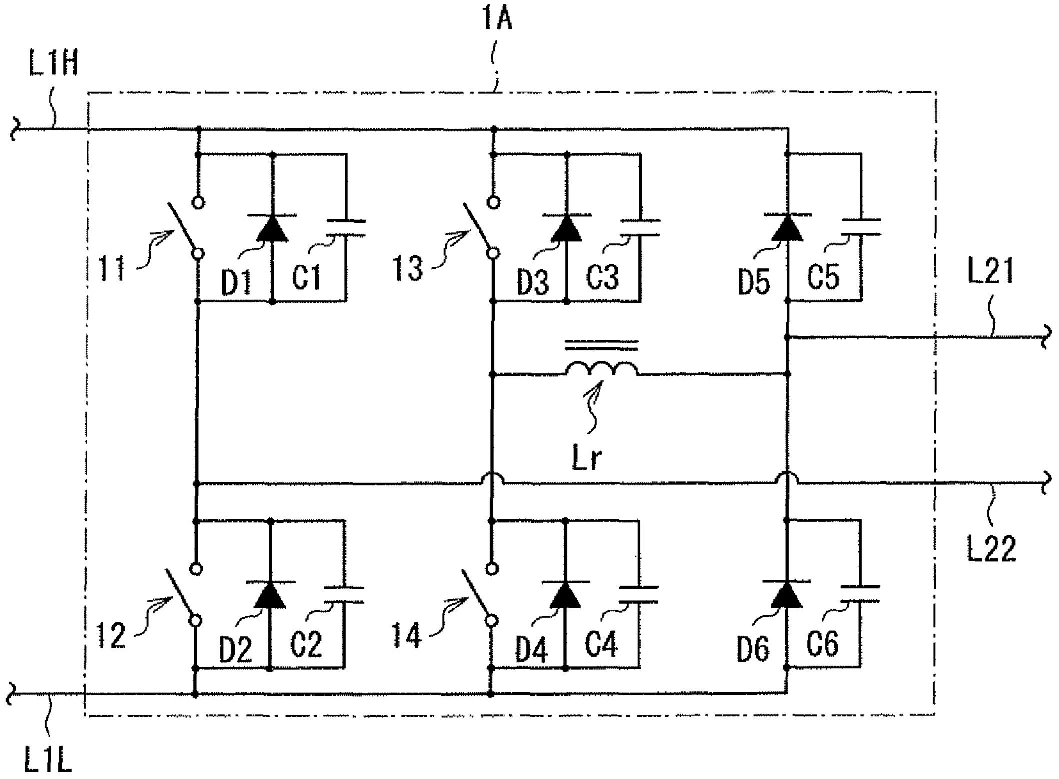
FIG. 23 is a circuit diagram showing a configuration of an inverter circuit according to another Modification of the present invention.

An inverter 1A having such a circuit configuration as shown in FIG. 23, for example, may be provided instead of the inverter 1 of the above-mentioned embodiment and so on. The inverter 1A is configured such that rectifier diodes D1 to D4 and capacitors C1 to C4 are respectively connected in parallel to the switching elements 11 to 14 of the inverter 1, and a parallel connection pair constituted from a rectifier diode D5 and a capacitor C5 and a parallel connection pair constituted from a rectifier diode D6 and a capacitor C6, which are arranged in parallel to an arm where the switching elements 11 and 12 have been arranged and an arm where the switching elements 13 and 14 have been arranged, are mutually connected in series. A resonance inductor Lr is disposed between a connection point of the switching elements 13 and 14 and a connection point of the diodes D5 and D6. Connection of each rectifier diodes D1 to D6 is a reversely biased connection (the cathode side is connected to the primary side high voltage line L1H, and the anode side is connected to the primary side low voltage line L1L). With such inverter 1A, it becomes possible to effectively restrain the surge voltage applied to the rectifier diodes 51 and 52, etc. in the rectifier circuit 5, due to resonant action applied by an LC resonance circuit.

In the above-mentioned embodiment and so on, description is made as to the case in which the inverter circuit 1 is an inverter circuit of a full bridge type, but it is not limited thereto and may be a half bridge type, a forward type and so on.

Figure 24:
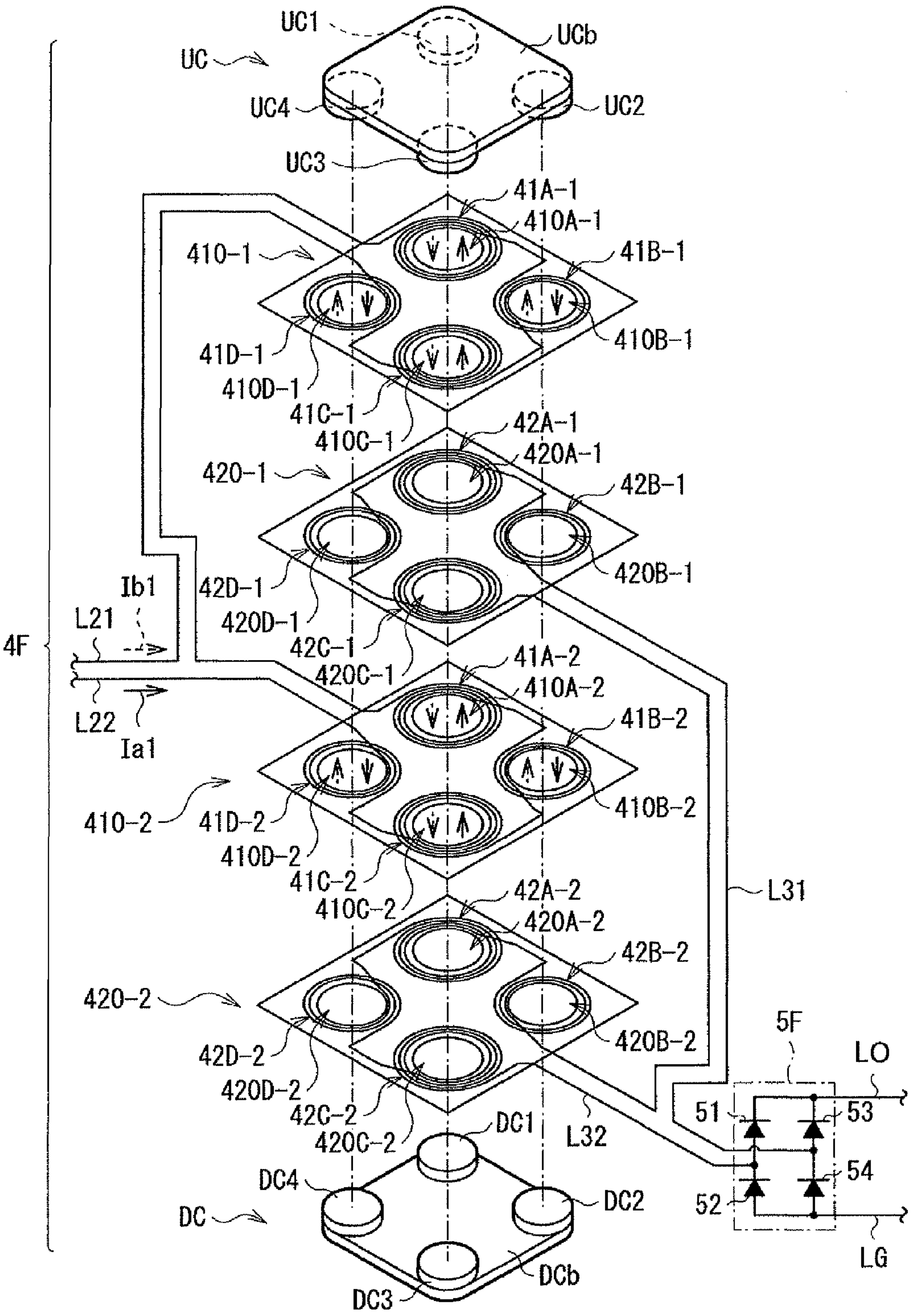
FIG. 24 is an exploded perspective view and a circuit diagram showing a configuration of a transformer and a rectifier circuit according to another Modification of the present invention.

In the above-mentioned embodiment and so on, description is made as to the case in which the rectifier circuits 5, 5B to 5D are of a center tap type having a configuration of anode common connection, but it is not limited thereto. Specifically, for example, it may have a configuration of cathode common connection of a center tap type instead of anode common connection, or may be a type other than the center tap type (full-bridge type, half bridge type, forward type and flyback type, etc., for example). A rectifier circuit of a half-wave-rectification type may also be applicable instead of full-wave-rectification type. Specifically, for example, FIG. 24 is an exploded perspective view showing a configuration circuit of a full-bridge rectifier circuit 5F and a transformer 4F connected thereto. The rectifier circuit 5F is constituted from four rectifier diodes 51 to 54. The transformer 4F includes a magnetic core 40 constituted from an upper core UC and a lower core DC, a printed coil 410-1 that constitutes primary windings 41A-1, 41B-1, 41C-1 and 41D-1, a printed coil 410-2 that constitutes primary windings 41A-2, 41B-2, 41C-2 and 41D-2, a printed coil 420-1 that constitutes secondary windings 42A-1, 4213-1, 42C-1 and 42D-1, and a printed coil 420-2 that constitutes secondary windings 42A-2, 42B-2, 42C-2 and 42D-2. The printed coil 410-1 has four through-holes 410A-1, 410B-1, 410C-1 and 410D-1 through which the four leg portions of the upper core UC and the lower core DC are passing one to one. The printed coil 410-2 has four through-holes 410A-2, 410B-2, 410C-2, and 410D-2 through which the above-mentioned four legs are passing one to one. The printed coil 420-1 has four through-holes 420A-1, 420B-1, 420C-1 and 420D-1 through which the four leg portions are passing one to one, and is connected to the rectifier circuit 5F via a connection line L31. The printed coil 420-2 has four through-holes 420A-2, 420B-2, 420C-2 and 420D-2 through which the four leg portions are passing one to one, and is connected to the rectifier circuit 5F via a connection line L32.

In the above-mentioned embodiment and so on, description is made as to a step-down DC-DC converter by which a DC output voltage Vout is generated by stepdowning a DC input voltage Vin. However, to the contrary, the invention may be also applied to a step-up DC-DC converter by which a DC output voltage Vout is generated by boosting a DC input voltage Yin. Further, it is not limited to those that output voltages in one direction, and it may also be applied to a bidirectional converter that outputs voltages in both directions, a multiple-output converter and so on.

Although description is made about a DC-DC converter as an example of the switching power supply unit according to the above-mentioned embodiment and so on, the transformer of the present invention may also be applied to a switching power supply unit other than the DC-DC converter (for example, AC-DC converter, DC-AC inverter, etc.).

What is more, modifications and so on as described above may be combined.

The present application contains subject matter related to that disclosed in Japanese Priority Patent Application JP2010-011682 filed in the Japan Patent Office on Jan. 22, 2010, the entire content of which is hereby incorporated by reference. It should be understood by those skilled in the art that various modifications, combinations, sub-combinations and alterations may occur depending on design requirements and other factors insofar as they are within the scope of the appended claims or the equivalents thereof.

What is claimed is:

1. A transformer comprising:

a magnetic core including two base-plates facing each other and four legs provided between the two base-plates to couple the two base-plates together, the four legs being arranged along a pair of diagonal lines intersecting each other in a plane along facing surfaces of the two base-plates;

a first conductive member having four through-holes through which the four legs pass respectively, and configuring a first winding which is wound around the legs; and one or more second conductive members each having four through-holes through which the four legs pass, respectively, and each configuring a second winding which is wound around the four legs, wherein the first and second windings are wound around so that closed magnetic paths are formed inside the magnetic core from the four legs to the two base-plates due to currents which flow through the first or the second winding, and so that a couple of magnetic fluxes each generated inside each of a couple of legs arranged along one of the two diagonal lines are both directed in a first direction, while so that another couple of magnetic fluxes each generated inside each of another couple of legs arranged along another diagonal line are both directed in a second direction which is opposite to the first direction.

2. The transformer according to claim 1, wherein there proved two second conductive members, as the second conductive members, disposed to sandwich the first conductive member.

3. The transformer according to claim 2, wherein the second winding, as the second conductive member, includes two winding portions connected in series to be wound around the four legs.

4. The transformer according to claim 2, wherein the second winding, as the second conductive member, includes two winding portions connected in parallel to be wound around the four legs.

5. The transformer according to claim 1, wherein there proved only one second conductive member, as the second conductive members, on one side of the first conductive member, the one side facing either one of the two base-plates; and the second winding, as the second conductive member, includes two winding portions connected in parallel to be wound around the four legs.

6. The transformer according to claim 1, wherein the first winding, as the first conductive member, is wound around each of the four legs one by one in a sequential manner.

7. The transformer according to claim 1, wherein the first winding, as the first conductive member, is wound around one pair of legs of the four legs, and then wound around another pair of legs of the four legs, the one pair of legs being arranged along one of the pair of diagonal lines, and the another pair of legs being arranged along another diagonal line.

8. The transformer according to claim 1, wherein the four legs are configured such that inner side-faces of the four legs, which mutually face each other, are parallel with each other.

9. The transformer according to claim 8, wherein outer surfaces of the four legs, on a side opposite to the inner side-faces, are curved.

10. The transformer according to claim 1, wherein the first and second windings are configured to be lead to outside along the in-plane direction of the first and the second conductive members.

11. The transformer according to claim 1, wherein the four legs are disposed, respectively, at four corners of a square plane of the base-plate.

12. The transformer according to claim 1, wherein one or both of the two base-plates has an opening.

13. The transformer according to claim 12, further comprising a heat dissipating member including:

a base portion thermally coupled to the base-plate having the opening; and a protruding portion shaped to be inserted in the opening, and thermally coupled to the first or the second conductive member.

14. A transformer comprising:

a magnetic core including two base-plates facing each other and four legs provided between the two base-plates to couple the two base-plates together, the four legs being arranged along a pair of diagonal lines intersecting each other in a plane along facing surfaces of the two base-plates;

a first conductive member having four through-holes through which the four legs pass respectively, and configuring a first winding which is wound around the legs; and one or more second conductive members each having four through-holes through which the four legs pass, respectively, and each configuring a second winding which is wound around the four legs, wherein the first and second windings are wound around so that four closed magnetic paths are formed inside the magnetic core from the four legs to the two base-plates due to currents which flow through the first or the second winding, the four closed magnetic paths each passing through both adjacent two of the four legs and the two base-plates and then returning.

* * * * *